US012249182B2

(12) United States Patent
Tagawa et al.

(10) Patent No.: US 12,249,182 B2
(45) Date of Patent: **\*Mar. 11, 2025**

(54) IMAGE PROVIDING APPARATUS, IMAGE PROVIDING SYSTEM, IMAGE PROVIDING METHOD, AND NON-TRANSITORY COMPUTER READABLE MEDIUM

(71) Applicant: NEC Corporation, Tokyo (JP)

(72) Inventors: Risa Tagawa, Tokyo (JP); Noriyuki Hiramoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 18/008,710

(22) PCT Filed: Jun. 10, 2020

(86) PCT No.: PCT/JP2020/022848
§ 371 (c)(1),
(2) Date: Dec. 7, 2022

(87) PCT Pub. No.: WO2021/250814
PCT Pub. Date: Dec. 16, 2021

(65) Prior Publication Data
US 2023/0222834 A1    Jul. 13, 2023

(51) Int. Cl.
*G06V 40/16* (2022.01)
*G06F 21/32* (2013.01)
(Continued)

(52) U.S. Cl.
CPC ........... *G06V 40/168* (2022.01); *G06F 21/32* (2013.01); *G06V 10/751* (2022.01); *G06V 40/172* (2022.01); *G06V 40/50* (2022.01)

(58) Field of Classification Search
None
See application file for complete search history.

(56) References Cited

U.S. PATENT DOCUMENTS

| 8,254,663 B2 * | 8/2012 | Kataoka | G06T 7/0004 |
| | | | 382/312 |
| 10,579,865 B2 * | 3/2020 | Yoo | G06V 10/454 |

(Continued)

FOREIGN PATENT DOCUMENTS

| JP | 2013-041416 A | 2/2013 |
| JP | 2015-128259 A | 7/2015 |

OTHER PUBLICATIONS

International Search Report for PCT Application No. PCT/JP2020/022848, mailed on Aug. 4, 2020.

*Primary Examiner* — Kambiz Zand
*Assistant Examiner* — Mahabub S Ahmed

(57) ABSTRACT

An image providing apparatus (10) includes a registration unit (12) for registering a plurality of captured images of a predetermined user taken at a plurality of locations, respectively, in a storage unit (11), an acquisition unit (13) for acquiring a first image of the user captured at a specific location, a specification unit (14) for specifying one or more second images including a face area whose degree of match with a face area of the user included in the first image is greater than or equal to a predetermined value from among the plurality of captured images, a generation unit (15) for generating a composite image including the specified second image, and an output unit (16) for outputting the composite image.

15 Claims, 24 Drawing Sheets

(51) Int. Cl.
   *G06V 10/75*   (2022.01)
   *G06V 40/50*   (2022.01)

(56) References Cited

U.S. PATENT DOCUMENTS

| | | | | |
|---|---|---|---|---|
| 11,283,937 | B1* | 3/2022 | Svendsen | H04N 1/00209 |
| 11,631,278 | B2* | 4/2023 | Hayase | G06V 40/161 |
| | | | | 382/118 |
| 2004/0169681 | A1* | 9/2004 | Van Kesteren | G06F 3/0483 |
| | | | | 715/764 |
| 2014/0181989 | A1* | 6/2014 | Sako | H04W 4/029 |
| | | | | 726/26 |
| 2015/0242605 | A1* | 8/2015 | Du | G06F 21/32 |
| | | | | 726/7 |
| 2015/0269420 | A1* | 9/2015 | Kim | H04L 67/10 |
| | | | | 382/118 |
| 2015/0332087 | A1* | 11/2015 | Joshi | G06F 18/23 |
| | | | | 382/203 |
| 2016/0109940 | A1* | 4/2016 | Lyren | G06F 3/011 |
| | | | | 463/2 |
| 2016/0125413 | A1* | 5/2016 | Lin | G06Q 20/4014 |
| | | | | 705/44 |
| 2016/0196417 | A1* | 7/2016 | Tokunaga | G06V 40/161 |
| | | | | 726/19 |
| 2016/0277419 | A1* | 9/2016 | Allen | H04L 63/102 |
| 2017/0011264 | A1* | 1/2017 | Smolic | G11B 27/105 |
| 2017/0103643 | A1* | 4/2017 | Powers, III | E05G 1/00 |
| 2017/0116466 | A1* | 4/2017 | Resnick | G06V 20/46 |
| 2017/0132458 | A1* | 5/2017 | Short | G06V 40/172 |
| 2018/0189550 | A1* | 7/2018 | McCombe | G06V 40/166 |
| 2018/0189551 | A1* | 7/2018 | Ranganath | G06V 40/50 |
| 2018/0350102 | A1* | 12/2018 | Ogawa | G06T 7/246 |
| 2018/0373924 | A1* | 12/2018 | Yoo | G06V 10/454 |
| 2019/0057249 | A1* | 2/2019 | Hayase | G06V 40/161 |
| 2019/0095750 | A1* | 3/2019 | Kawase | G06V 40/50 |
| 2020/0065548 | A1* | 2/2020 | Hwang | G06V 20/52 |
| 2020/0204541 | A1* | 6/2020 | Nair | H04L 63/0853 |
| 2021/0034895 | A1* | 2/2021 | John Archibald | G11B 40/45 |
| 2021/0142045 | A1* | 5/2021 | Noest | H04N 13/282 |
| 2021/0174573 | A1* | 6/2021 | Itou | G06F 3/167 |
| 2021/0182535 | A1* | 6/2021 | Boic | G06V 40/172 |
| 2021/0192187 | A1* | 6/2021 | Kim | G06T 7/50 |
| 2021/0200999 | A1* | 7/2021 | Hayase | G06V 40/161 |
| 2021/0209346 | A1* | 7/2021 | Resnick | G06V 10/454 |
| 2022/0318369 | A1* | 10/2022 | Chae | G06V 10/751 |
| 2023/0230302 | A1* | 7/2023 | Tagawa | G06V 40/172 |
| | | | | 382/118 |
| 2024/0046697 | A1* | 2/2024 | Mumm | G06F 21/32 |

* cited by examiner

IMAGE PROVIDING APPARATUS, IMAGE PROVIDING SYSTEM, IMAGE PROVIDING METHOD, AND NON-TRANSITORY COMPUTER READABLE MEDIUM

This application is a National Stage Entry of PCT/JP2020/022848 filed on Jun. 10, 2020, the contents of all of which are incorporated herein by reference, in their entirety.

TECHNICAL FIELD

The present disclosure relates to an image providing apparatus, an image providing system, an image providing method, and a non-transitory computer readable medium. In particular, the present disclosure relates to an image providing apparatus, an image providing system, an image providing method, and a non-transitory computer readable medium for providing images.

BACKGROUND ART

Patent Literature 1 discloses a technique that, in a so-called stamp rally (point rally) in which an aim is achieved by visiting a plurality of locations, verifies a visit at each location by performing face authentication with a camera installed at each location.

CITATION LIST

Patent Literature

Patent Literature 1: Japanese Unexamined Patent Application Publication No. 2013-41416

SUMMARY OF INVENTION

Technical Problem

The technique disclosed in Patent Literature 1 does not utilize the stamp rally sufficiently. For example, the technique disclosed in Patent Literature 1 cannot provide users with a record of visiting each location.

The present disclosure has been made to solve such a problem and an object thereof is to provide an image providing apparatus, an image providing system, an image providing method, and a non-transitory computer readable medium for providing an image which records a visit of each location to a user who actually visited the location.

Solution to Problem

In a first example aspect of the present disclosure, an image providing apparatus includes:
 registration means for registering a plurality of captured images of a predetermined user taken at a plurality of locations, respectively, in storage means;
 acquisition means for acquiring a first image of the user captured at a specific location;
 specification means for specifying one or more second images including a face area whose degree of match with a face area of the user included in the first image is greater than or equal to a predetermined value from among the plurality of captured images;
 generation means for generating a composite image including the specified second image; and
 output means for outputting the composite image.

In a second example aspect of the present disclosure, an image providing system includes:
 a plurality of first imaging devices installed at a plurality of locations, respectively;
 a second imaging device installed at a specific location; and
 an image providing apparatus connected to the plurality of first imaging devices and the second imaging device.
The image providing apparatus includes:
 storage means;
 registration means for registering a plurality of captured images of a predetermined user taken by the plurality of first imaging devices, respectively, in the storage means;
 acquisition means for acquiring a first image of the user captured by the second imaging device;
 specification means for specifying one or more second images including a face area whose degree of match with a face area of the user included in the first image is greater than or equal to a predetermined value from among the plurality of captured images;
 generation means for generating a composite image including the specified second image; and
 output means for outputting the composite image.

In a third example aspect of the present disclosure, an image providing method performed by a computer includes:
 registering a plurality of captured images of a predetermined user taken at a plurality of locations, respectively, in a storage device;
 acquiring a first image of the user captured at a specific location;
 specifying one or more second images including a face area whose degree of match with a face area of the user included in the first image is greater than or equal to a predetermined value from among the plurality of captured images;
 generating a composite image including the specified second image; and
 outputting the composite image.

In a fourth example aspect of the present disclosure, a non-transitory computer readable medium storing an image providing program for causing a computer to execute:
 registration processing for registering a plurality of captured images of a predetermined user taken at a plurality of locations, respectively, in storage means;
 acquisition processing for acquiring a first image of the user captured at a specific location;
 specifying processing for specifying one or more second images including a face area whose degree of match with a face area of the user included in the first image is greater than or equal to a predetermined value from among the plurality of captured images;
 generation processing for generating a composite image including the specified second image; and
 output processing for outputting the composite image.

Advantageous Effects of Invention

According to the present disclosure, it is possible to provide an image providing apparatus, an image providing system, an image providing method, and a non-transitory computer readable medium for providing an image recording a visit of each location to a user who actually visited the location.

EXAMPLE EMBODIMENT

Example embodiments of the present disclosure will be described in detail below with reference to the drawings. In each drawing, the same or corresponding elements are given the same symbols, and repeated descriptions are omitted as necessary for clarity.

First Example Embodiment

Figure 1:
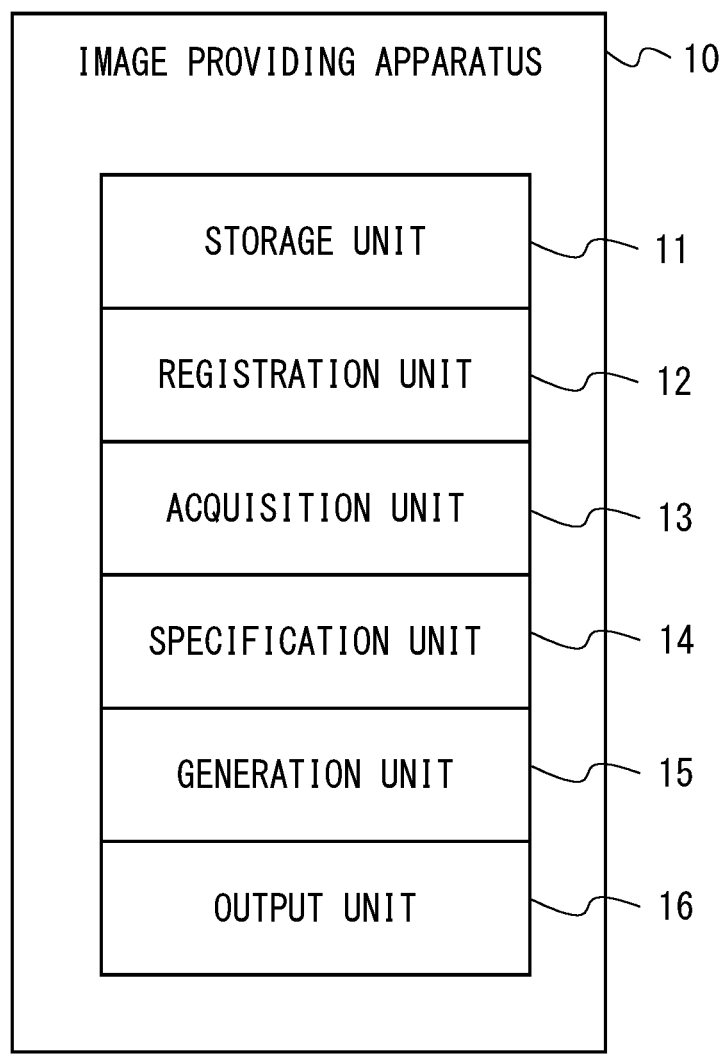
FIG. 1 is a block diagram showing a configuration of an image providing apparatus according to a first example embodiment.

FIG. 1 is a block diagram showing a configuration of an image providing apparatus 10 according to a first example embodiment. The image providing apparatus 10 is an information processing device for providing a user with, at a specific location, a composite image obtained by combining captured images including the user taken at a plurality of locations. Here, the image providing apparatus 10 is connected to a network (not shown). The network may be wired or wireless. In addition, the network is connected to an imaging device (not shown) installed at each location. The imaging device may be a face authentication terminal, a digital signage with a camera, or the like.

The image providing apparatus 10 includes a storage unit 11, a registration unit 12, an acquisition unit 13, a specification unit 14, a generation unit 15, and an output unit 16. The storage unit 11 is a storage area for storing captured images. The registration unit 12 registers a plurality of captured images of a predetermined user captured at the plurality of locations, respectively, in the storage unit 11. The acquisition unit 13 acquires a first image of the user taken at the specific location. The specific location may or may not be included in the plurality of locations. The specification unit 14 specifies one or more second images including a face area whose degree of match with a face area of the user included in the first image is greater than or equal to a predetermined value from among the plurality of captured images. The generation unit 15 generates a composite image including the specified second image. Here, when there are two or more second images, the composite image is obtained by combining the second images in such a way that they can be individually identified. When there is only one second image, the image is a composite image of a predetermined template and the second image. The output unit 16 outputs the composite image. An output destination of the composite image is, for example, a face authentication terminal, a digital signage, an image storage server, or an information processing terminal owned by the user installed at a specific location.

Figure 2:
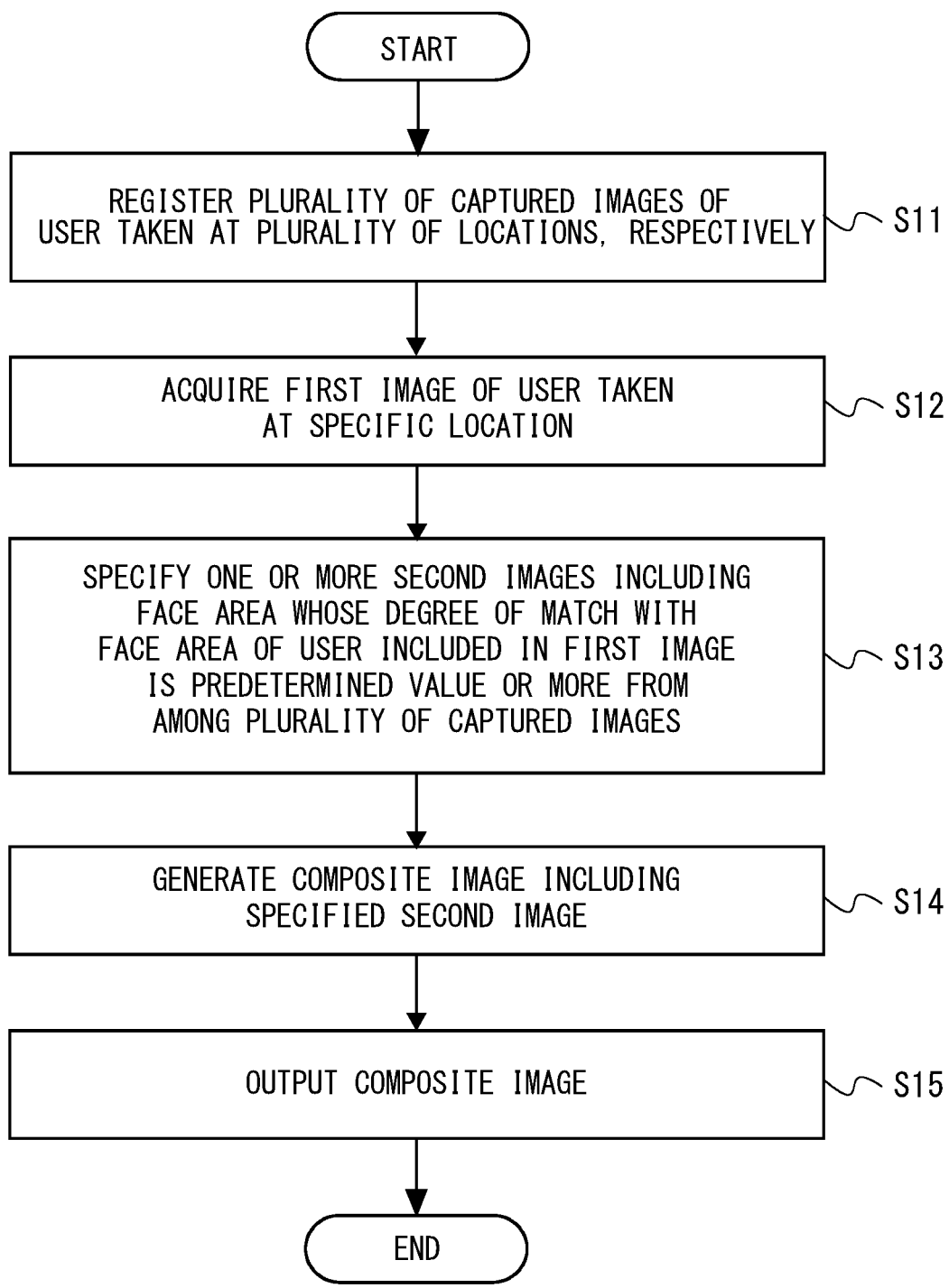
FIG. 2 is a flowchart showing a flow of an image providing method according to the first example embodiment.

FIG. 2 is a flowchart showing a flow of an image providing method according to the first example embodiment. First, the registration unit 12 registers a plurality of captured images of a predetermined user captured at a plurality of locations, respectively, in the storage unit 11 (S11). Next, the acquisition unit 13 acquires a first image of the user taken at a specific location (S12). Next, the specification unit 14 specifies one or more second images including a face area whose degree of match with a face area of the user included in the first image is greater than or equal to a predetermined value from among the plurality of captured images (S13). Next, the generation unit 15 generates a composite image including the specified second image (S14). After that, the output unit 16 outputs the composite image (S15).

In this way, this example embodiment can provide an image including a captured image (taken at each location) that is a record of a visit of the location to the user who actually visited the location. For example, a user who has visited each location at a tourist destination can obtain an image, which is an automatically aggregated image of images captured only locally, at a location on the way back. This motivates users to visit each location.

The image providing apparatus 10 includes a processor, a memory, and a storage device (not shown). The storage device stores computer programs in which processing of the image providing method according to this example embodiment is implemented. The processor reads the computer programs from the storage device into the memory and executes the computer programs. In this way, the processor implements the functions of the registration unit 12, the acquisition unit 13, the specification unit 14, the generation unit 15, and the output unit 16.

Alternatively, each of the registration unit 12, the acquisition unit 13, the specification unit 14, the generation unit 15, and the output unit 16 may be implemented by dedicated hardware. Further, some or all of the constituent elements of each device may be implemented by general-purpose or dedicated circuitry, processors, etc., or a combination thereof. These constituent elements may be composed of a single chip or a plurality of chips connected via a bus. Some or all of the constituent elements of each device may be implemented by a combination of the circuitry, the program, and the like described above. The processor may be a CPU (Central Processing Unit), a GPU (Graphics Processing Unit), an FPGA (field-programmable gate array), or the like.

Further, when some or all of the constituent elements of the image providing apparatus 10 are implemented by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the image providing apparatus 10 may be provided in a SaaS (Software as a Service) format.

Second Example Embodiment

Figure 3:
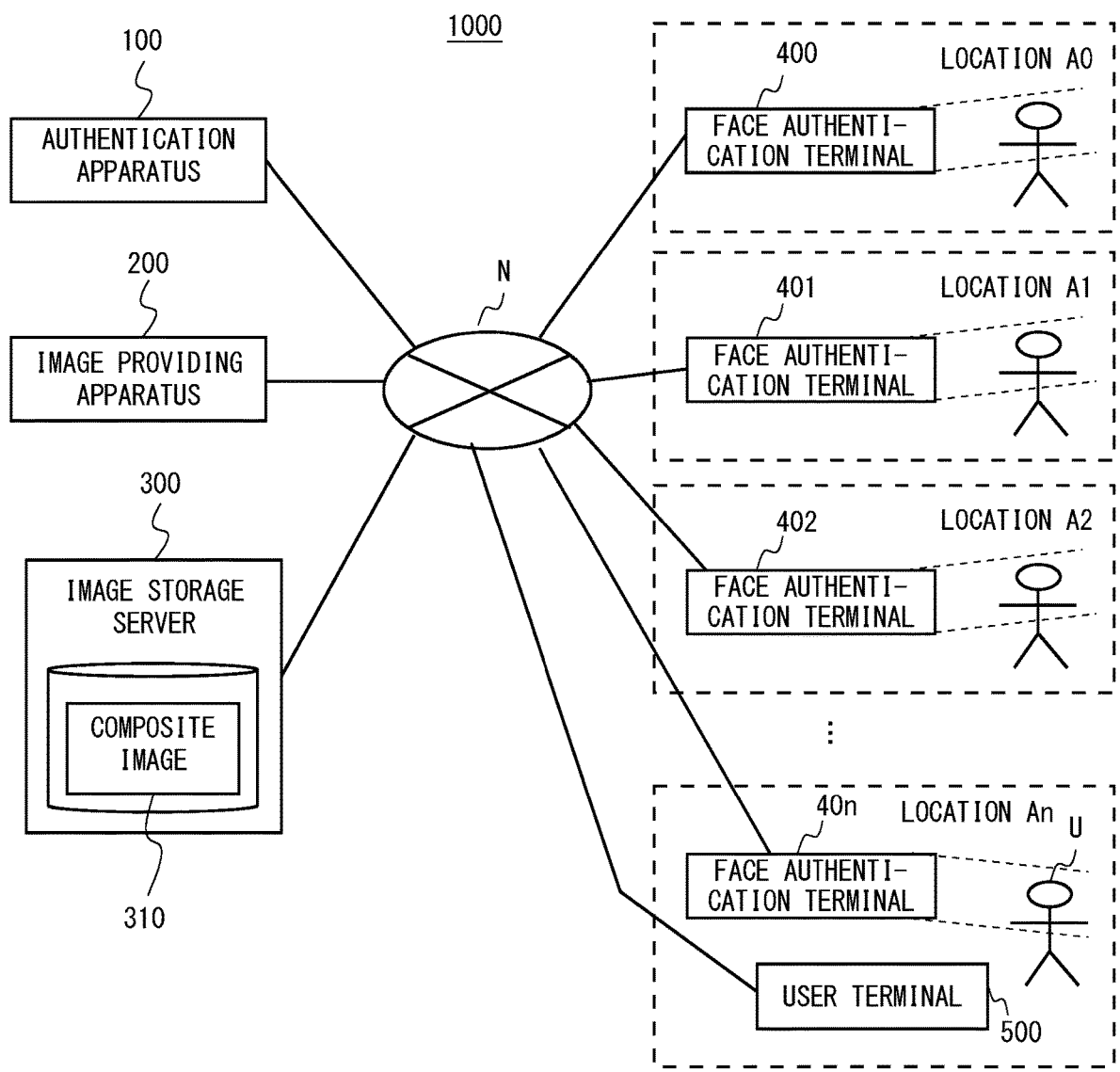
FIG. 3 is a block diagram showing an overall configuration of an image providing system according to a second example embodiment.

A second example embodiment is a specific example of the first example embodiment described above. FIG. 3 is a block diagram showing an overall configuration of an image providing system 1000 according to the second example embodiment. The image providing system 1000 includes an authentication apparatus 100, an image providing apparatus 200, an image storage server 300, face authentication terminals 400 to 40n (n is a natural number greater than or equal to two), and a user terminal 500. The authentication apparatus 100, the image providing apparatus 200, the image storage server 300, the face authentication terminals 400 to 40n, and the user terminal 500 are connected to each other via a network N. Here, the network N is a wired or wireless communication line.

The face authentication terminals 400, 401, 402, and ... 40n are installed at the locations A0, A1, A2, and ... An, respectively. Here, the locations A0 to An are different tourist spots in a certain area A. The locations A0 to An shall be check points for a stamp rally based on face authentication in the area A. Therefore, a user U visits the location A0 as a starting location, visits A1 to An−1, and visit the location An as a final location. Here, the location An shall be a "specific location". For example, the location An shall be the final destination of the stamp rally based on face authentication. The location An may be, for example, a boarding gate at an airport or a theme park exit. Alternatively, the location An may be an exit and entrance for boarding at an airport. That is, the face authentication terminal 40n may be a digital signage or the like installed in front of the boarding gate at the airport or in other airport facilities. The user U registers his/her own face information at the location A0, takes a commemorative photograph by using the face authentication terminals at the locations A1 to An−1. When face authentication is successful at the location An, the user U can acquire a composite image that is obtained by aggregating the captured images taken at the respective locations. The face information may be registered by any face authentication terminal desired by the user U or the user terminal 500.

The authentication apparatus 100 is an information processing device that stores facial feature information about a plurality of persons. In response to a face authentication request received from the outside, the authentication apparatus 100 collates the face image or facial feature information included in the request with the facial feature information about each user and sends back the check result (authentication result) to a request source.

Figure 4:
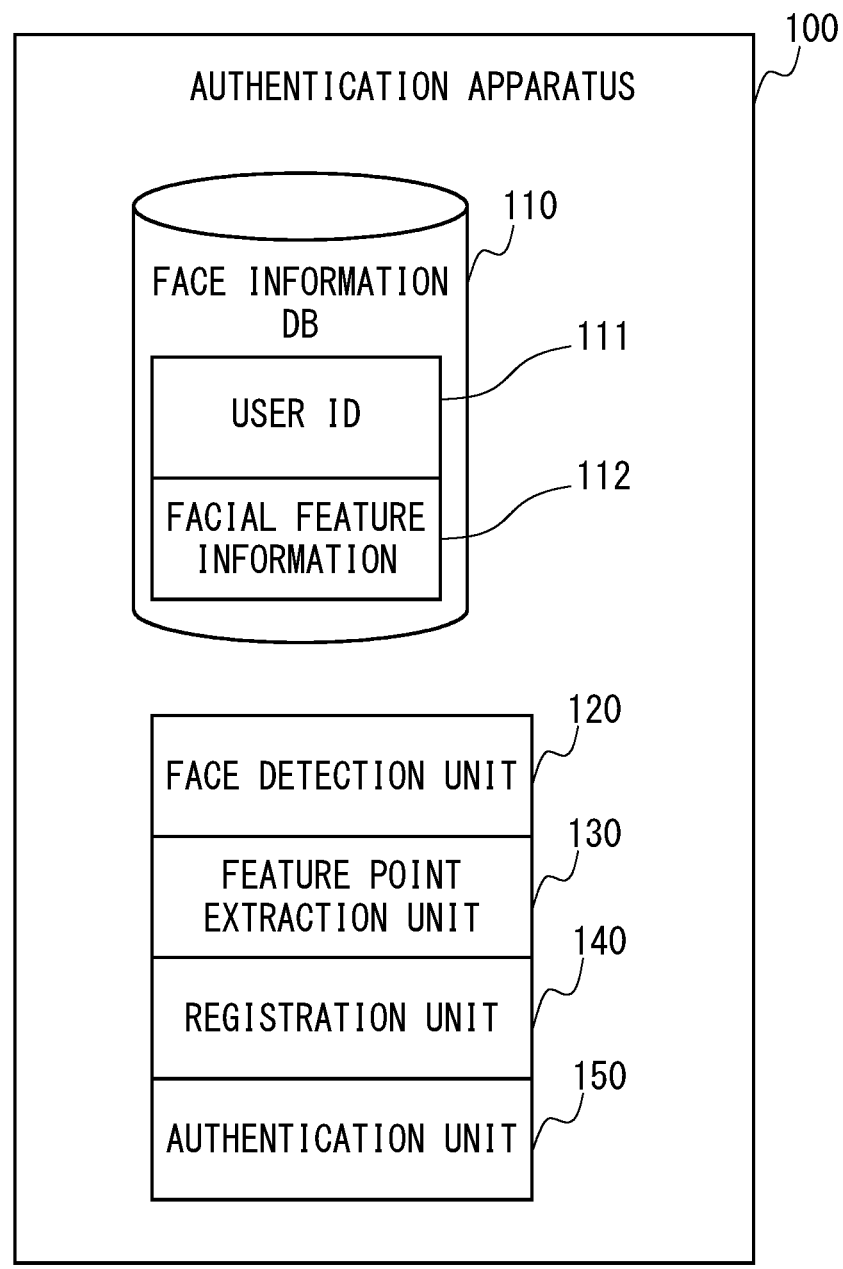
FIG. 4 is a block diagram showing a configuration of an authentication apparatus according to the second example embodiment.

FIG. 4 is a block diagram showing a configuration of the authentication apparatus 100 according to the second example embodiment. The authentication apparatus 100 includes a face information DB (DataBase) 110, a face detection unit 120, a feature point extraction unit 130, a registration unit 140, and an authentication unit 150. The face information DB 110 stores a user ID 111 and facial feature information 112 of the user ID in association with each other. The facial feature information 112 is a set of feature points extracted from the face image. The authentication apparatus 100 may delete the facial feature information 112 in the facial feature DB 110 in response to a request from a registered user of the facial feature information 112. Alternatively, the authentication apparatus 100 may delete the facial feature information 112 after a certain period of time has passed since its registration.

The face detection unit 120 detects a face area included in a registration image for registering face information and outputs it to a feature point extraction unit 130. The feature point extraction unit 130 extracts feature points from the face area detected by the face detection unit 120 and outputs the facial feature information to the registration unit 140. The feature point extraction unit 130 extracts the feature points included in the face image received from the image providing apparatus 200 and outputs the facial feature information to the authentication unit 150.

When the facial feature information is registered, the registration unit 140 issues a new user ID 111. The registration unit 140 registers the issued user ID 111 and the facial feature information 112 extracted from the registration image in the face information DB 110 in association with each other. The authentication unit 150 performs face authentication using the facial feature information 112. Specifically, the authentication unit 150 collates the facial feature information extracted from the face image with the facial feature information 112 in the face information DB 110. The authentication unit 150 sends back the presence or absence of a match between two pieces of the face feature information to the image providing apparatus 200. The presence or absence of the match between the two pieces of the face feature information corresponds to a success or a failure in authentication. Note that a match between the two pieces of the facial feature information (the presence of the match) means the degree of match is greater than or equal to a predetermined value.

Figure 5:
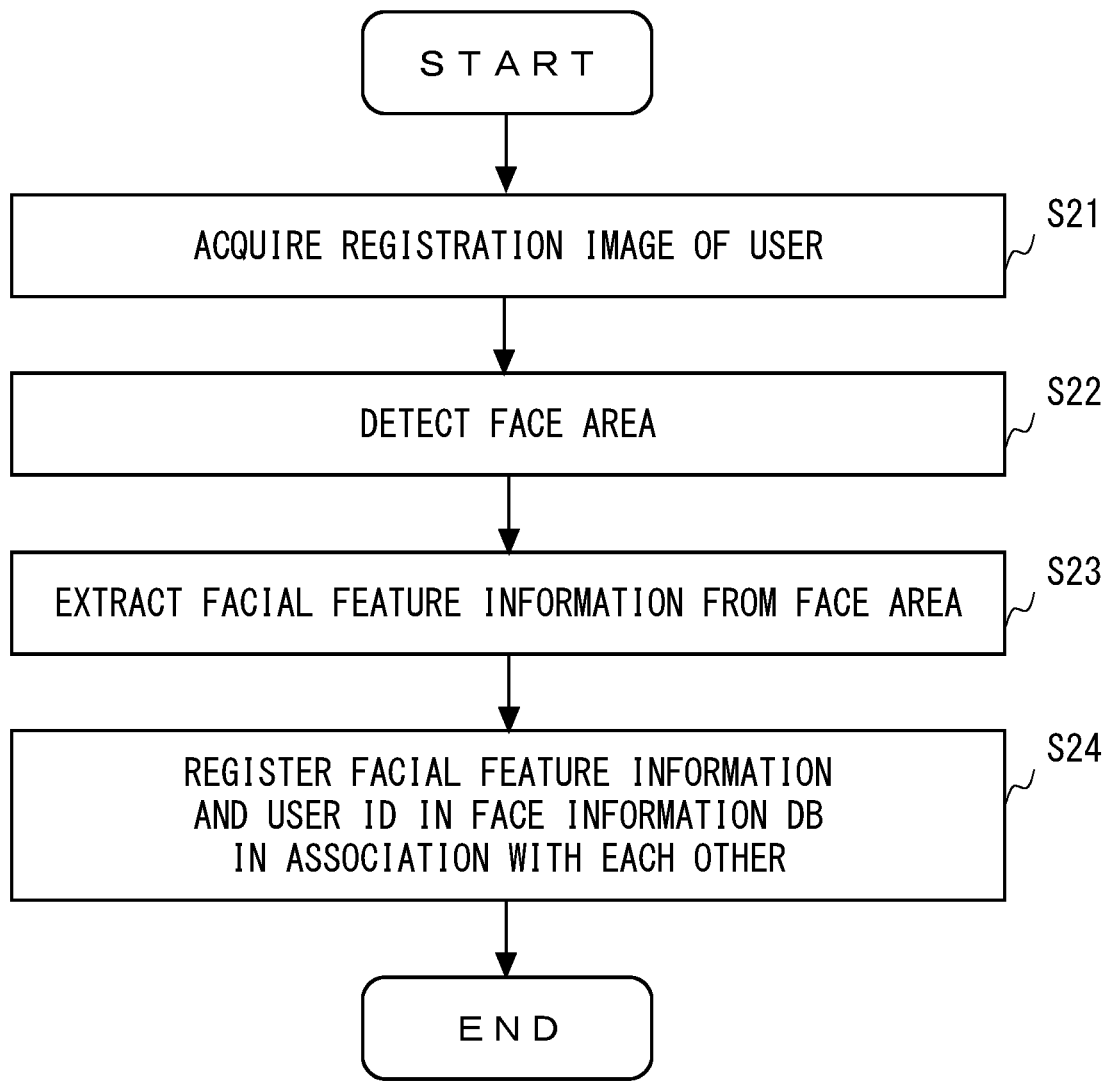
FIG. 5 is a flowchart showing a flow of face information registration processing according to the second example embodiment.

FIG. 5 is a flowchart showing a flow of face information registration processing according to the second example embodiment. First, the authentication apparatus 100 acquires the registration image included in the face information registration request (S21). For example, the authentication apparatus 100 accepts the face information registration request from the face authentication terminal 400, the user terminal 500 or the like via the network N. Next, the face detection unit 120 detects a face area included in the registration image (S22). Next, the feature point extraction unit 130 extracts feature points from the face area detected in Step S22 and outputs the facial feature information to the registration unit 140 (S23). Finally, the registration unit 140 issues the user ID 111 and registers the user ID 111 and the facial feature information 112 in the face information DB 110 in association with each other (S24). Note that the authentication apparatus 100 may receive the facial feature information 112 from the user terminal 500 or the like and register it in the face information DB 110 in association with the user ID 111.

Figure 6:
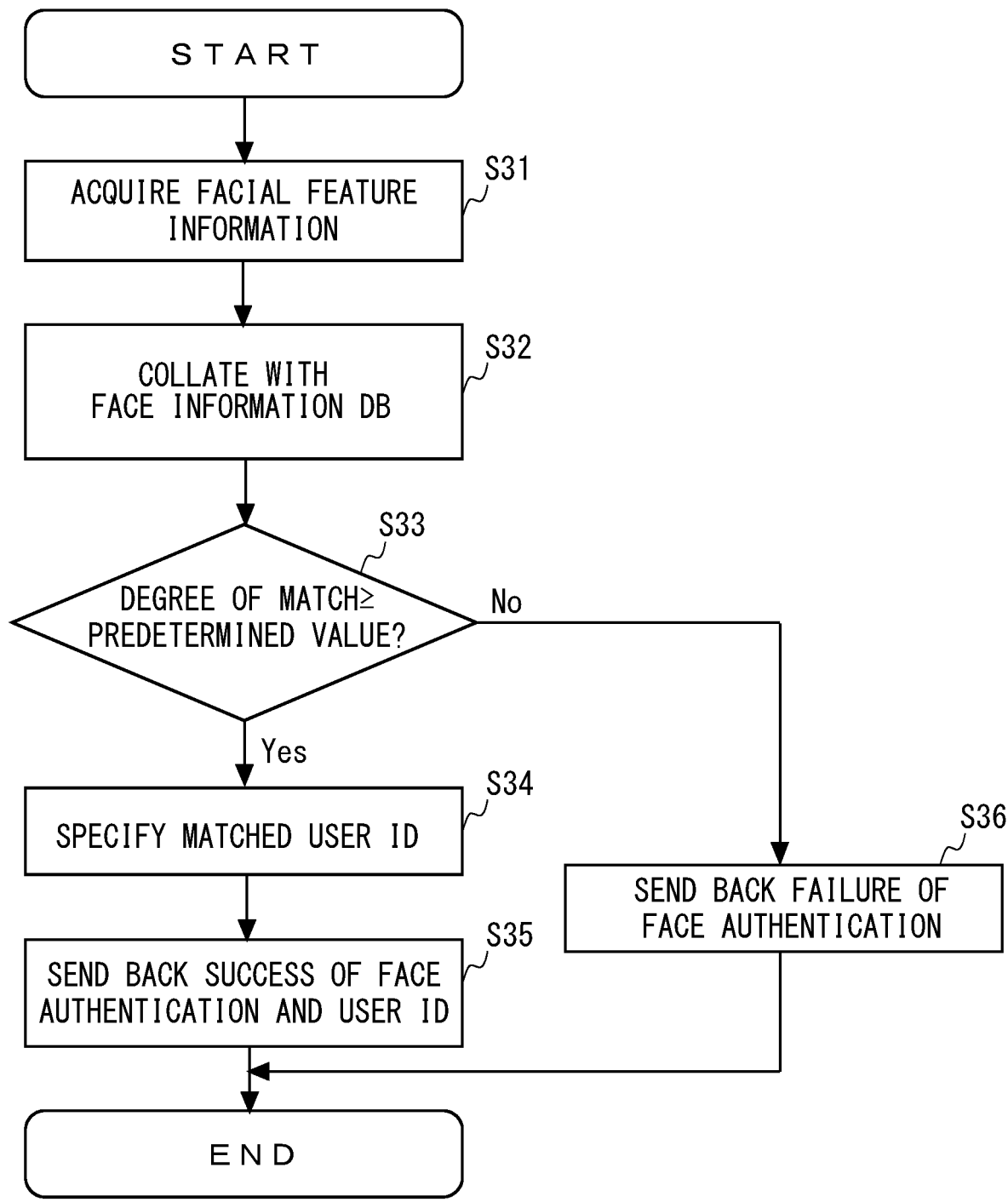
FIG. 6 is a flowchart showing the flow of the face authentication processing according to the second example embodiment.

FIG. 6 is a flowchart showing a flow of face authentication processing by the authentication apparatus 100 according to the second example embodiment. First, the feature point extraction unit 130 acquires a face image for authentication included in the face authentication request (S31). For example, the authentication apparatus 100 receives the face authentication request from the image providing apparatus 200 via the network N, and extracts the facial feature information from the face image included in the face authentication request as in Steps S21 to S23. Alternatively, the authentication apparatus 100 may receive the facial feature information from the image providing apparatus 200. Next, the authentication unit 150 collates the acquired facial feature information with the facial feature information 112 in the face information DB 110 (S32). When the two pieces of the facial feature information match, that is, when the degree of match between the two pieces of the facial feature information is greater than or equal to a predetermined value (Yes in S33), the authentication unit 150 specifies the user ID 111 of the user whose facial feature information matches the acquired facial feature information (S34), and sends back a success in the face authentication and the specified user ID 111 to the image providing apparatus 200 (S35). If no matching facial feature information is present (No in S33), the authentication unit 150 sends back a failure in the facial authentication to the image providing apparatus 200 (S36).

In Step S32, the authentication unit 150 need not to attempt to collate the facial feature information with all pieces of the facial feature information 112 in the face information DB 110. For example, the authentication unit 150 may attempt to preferentially collate the facial feature information registered in a period from a day the face authentication request is received to several days before the day. Alternatively, even if the facial feature information has been registered prior to this period, if a reservation has been made in advance to visit with a predetermined delay on a specified date, the authentication unit 150 may attempt to preferentially collate the facial feature information about the reserved user. These can improve the collation speed. In addition, if the above preferential collation fails, all pieces of the remaining facial feature information can be collated with.

Returning to FIG. 3, the explanation is continued. Each of the face authentication terminals 400, 401, 402, and . . . 40n is an information processing device including a camera and a display device.

The face authentication terminal 400 captures the registration image used for the face authentication of the user U. The face authentication terminal 400 transmits the face information registration request including the registration image to the authentication apparatus 100 via the network N. The user U may use the user terminal 500 to capture the registration image and register the face information.

The face authentication terminals 401 to 40n capture face images for authentication used for authenticating the user U's face. For example, the face authentication terminal 401 or the like uses the captured image taken for commemorative photography of the user U at each installed locations as images for authentication. The face authentication terminal 401 or the like transmits the face authentication request including the image for authentication to the image providing apparatus 200 via the network N. At this time, the face authentication terminal 401 or the like shall include, in the face authentication request, a location ID that identifies the location where it is installed. In addition, the face authentication terminal 401 or the like may include a captured time in the face authentication request. The face authentication terminal 401 or the like receives a face authentication result from the image providing apparatus 200 via the network N and displays it on the screen. Here, the face authentication terminal 401 or the like may have the function of a payment device for performing electronic payment based on face authentication. In that case, when the face authentication is successful, the face authentication terminal 401 or the like performs electronic payment and transmits a payment history to the image providing apparatus 200 via the network N. Note that the face authentication terminal 40n is not necessarily required to make a payment. Next, the face authentication terminal 40n transmits a composite image request together with the face authentication request. Alternatively, when the face authentication is successful, the face authentication terminal 40n transmits the composite image request. Next, the face authentication terminal 40n receives access information for the composite image or a storage destination of the composite image from the image providing apparatus 200 via the network N and displays it on the screen.

Figure 7:
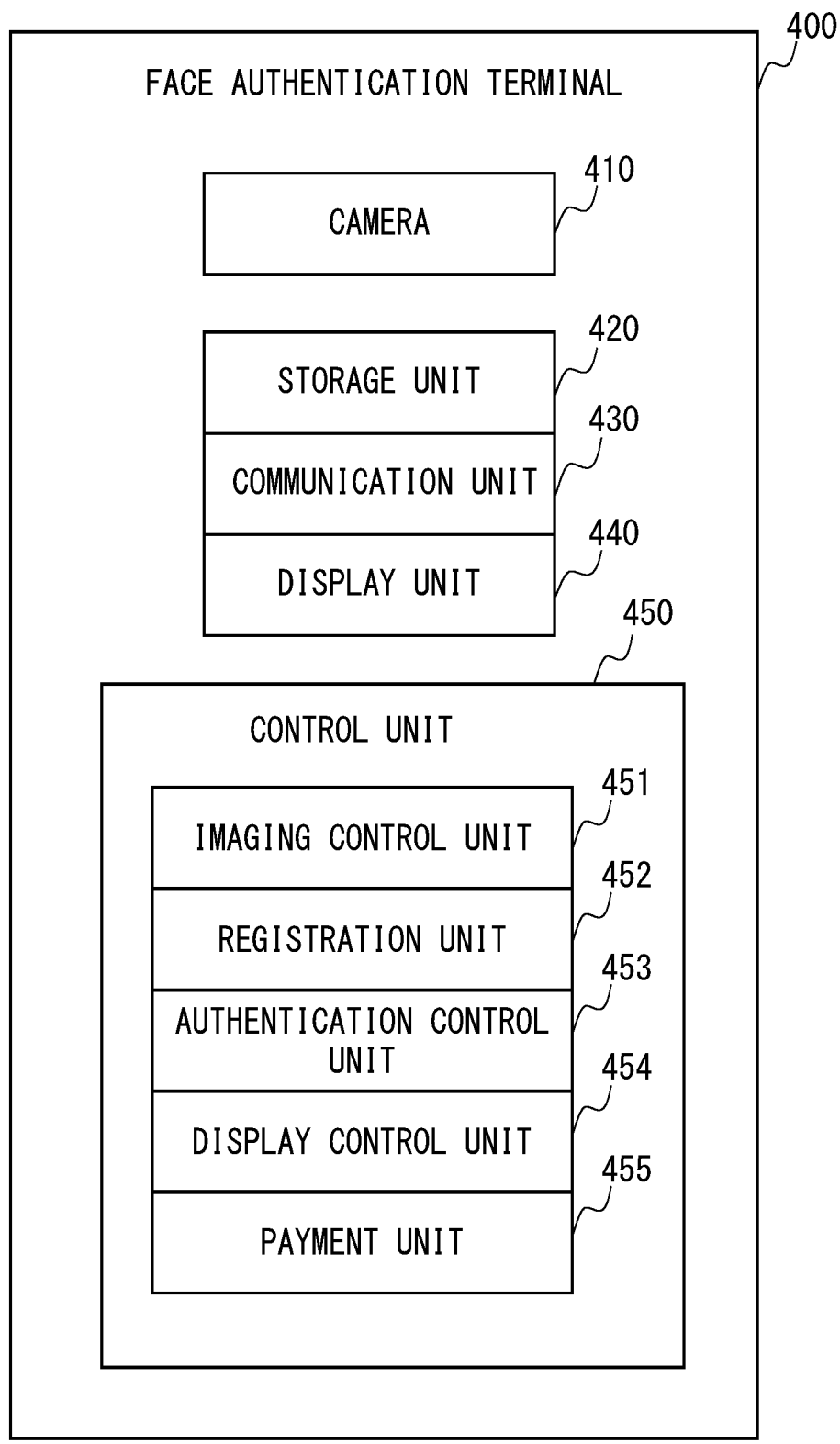
FIG. 7 is a block diagram showing a configuration of a face authentication terminal according to the second example embodiment.

Next, the face authentication terminal 400 will be described in detail. FIG. 7 is a block diagram showing a configuration of the face authentication terminal 400 according to the second example embodiment. Since the face authentication terminals 401 to 40n are the same as the face authentication terminal 400, they are not illustrated. The face authentication terminal 400 includes a camera 410, a storage unit 420, a communication unit 430, a display unit 440, and a control unit 450.

The camera 410 is an imaging device that captures an image under the control of the control unit 450. The storage unit 420 is a storage device that stores programs for implementing functions of the face authentication terminal 400. The communication unit 430 is a communication interface with the network N. The display unit 440 is at least a display device. Alternatively, the display unit 440 may be an input/output unit including a display device and an input device, for example, a touch panel. The control unit 450 controls hardware of the face authentication terminal 400. The control unit 450 includes an imaging control unit 451, a registration unit 452, an authentication control unit 453, a display control unit 454, and a payment unit 455. However, the payment unit 455 is not essential. In addition, the authentication control unit 453 is not essential in the face authentication terminal 400 installed at the location A0. In addition, the registration unit 452 is not essential in the face authentication terminals 401 to 40n installed at the locations A1 to An, respectively.

The imaging control unit 451 controls the camera 410 to capture the registration image of the user U or the image for authenticating the user U. The registration image and the image for authentication are images that include at least the face area of the user. The captured image (the image for authentication) at the location A1 or the like may include, in the background, a landscape or the like unique to the location. The imaging control unit 451 outputs the registration image to the registration unit 452. The imaging control unit 451 also outputs the image for authentication to the authentication control unit 453. The imaging control unit 451 may capture the user U at the time of payment by using the camera 410.

The registration unit 452 transmits the face information registration request including the registration image to the authentication apparatus 100 via the network N. The authentication control unit 453 transmits the face authentication request including the image for authentication to the image providing apparatus 200 via the network N, receives the face authentication result, and outputs the face authentication result to the display control unit 454 and the payment unit 455. The authentication control unit 453 also transmits the above composite image request to the image providing apparatus 200 via the network N, receives the access information for the composite image or the storage destination of the composite image, and then outputs it to the display control unit 454.

The display control unit 454 displays display contents according to the face authentication result on the display unit 440. In addition, the display control unit 454 displays the composite image or the access information for the storage destination of the composite image on the display unit 440.

When the face authentication result indicates a success of the face authentication, the payment unit 455 performs electronic payment by means of predetermined electronic payment means and transmits the payment history to the image providing apparatus 200 via the network N.

Returning to FIG. 3, the explanation is continued. The user terminal 500 is an information terminal owned by the user U. The user terminal 500 is, for example, a mobile phone terminal, a smartphone, a tablet terminal, a PC (Personal Computer) equipped with or connected to a camera, or the like. The user terminal 500 is associated with the user ID or the facial feature information about the user U. That is, the user terminal 500 is a display terminal that can be specified by the user ID or the facial feature information in the image providing apparatus 200. For example, the user terminal 500 is a terminal which the user U has already logged in with his/her own user ID.

The user terminal 500 transmits the registration image used for face authentication of the user U to the authentication apparatus 100, and issues the face information registration request. Note that the user terminal 500 may transmit the facial feature information extracted from the registration image to the authentication apparatus 100 to issue the face information registration request. The user terminal 500 reads the access information for the storage destination of the composite image and accesses the image storage server 300 corresponding to the access information via the network N. Next, the user terminal 500 acquires the composite image from the storage destination and displays it.

Figure 8:
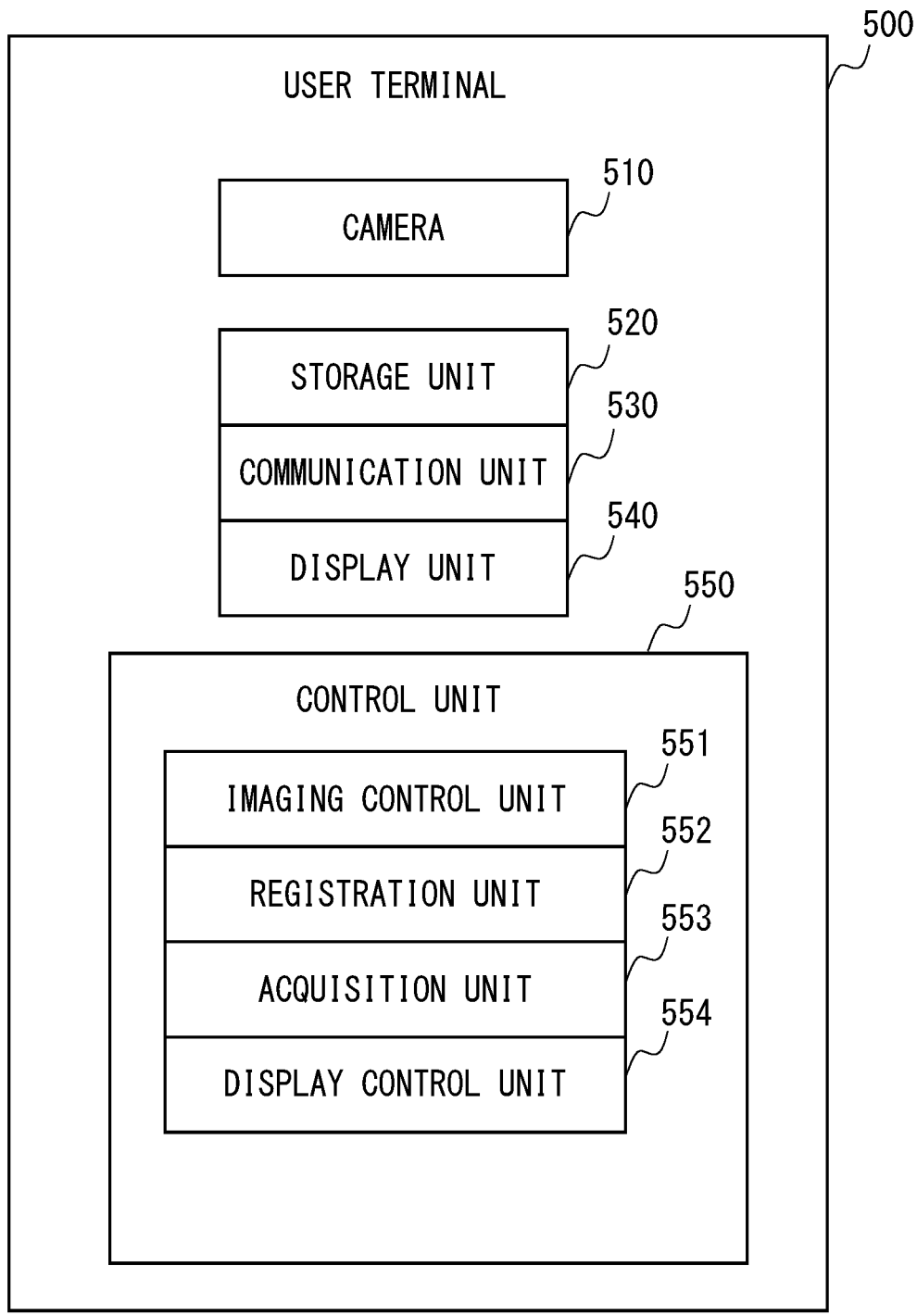
FIG. 8 is a block diagram showing a configuration of a user terminal according to the second example embodiment.

Next, the user terminal 500 will be described in detail. FIG. 8 is a block diagram showing a configuration of the user terminal 500 according to the second example embodiment. The user terminal 500 includes a camera 510, a storage unit 520, a communication unit 530, a display unit 540, and a control unit 550.

The camera 510 is an imaging device that captures an image under the control of the control unit 550. The storage unit 520 is a storage device that stores programs for implementing functions of the face authentication terminal 500. The communication unit 530 is a communication interface with the network N. The display unit 540 is an input/output unit including a display device and an input device, for example, a touch panel. The control unit 550 controls hardware of the user terminal 500. The control unit 550 includes an imaging control unit 551, a registration unit 552, an acquisition unit 553, and a display control unit 554.

The imaging control unit 551 controls the camera 510 to capture the registration image of the user U. The imaging control unit 551 outputs the registration image to the registration unit 552. The imaging control unit 551 captures the access information for the storage destination of the composite image displayed on the display unit 440 of the face authentication terminal 40$n$ installed at the location An by using the camera 510, and outputs the captured image to the acquisition unit 553.

The registration unit 552 transmits the face information registration request including the registration image to the authentication apparatus 100 via the network N. The acquisition unit 553 analyzes the captured image and restores it to the access information, and then accesses an address indicated by the access information via the network N. Here, the access information is, for example, a QR (Quick Response) code (registered trademark) obtained by two-dimensional barcoding a URL (Uniform Resource Locator) of the storage destination of the composite image on the image storage server 300. In this case, the acquisition unit 553 analyzes the QR code and converts it into a URL, and accesses the converted URL. The acquisition unit 553 acquires the composite image from the access destination via the network N and outputs it to the display control unit 554. The display control unit 554 displays the composite image on a display unit 540.

Returning to FIG. 3, the explanation is continued. The image providing apparatus 200 is an information processing device that, when the face authentication of the user U visiting the location An from the location A0 is successful at the location An, generates a composite image obtained by aggregating the captured images of the user U at respective locations, and provides the composite image to the user U. The image providing apparatus 200 may be redundant on a plurality of servers, and each functional block may be implemented by a plurality of computers.

The image storage server 300 is one or more file servers for storing the composite image 310 generated by the image providing apparatus 200. The image storage server 300 provides the composite image 310 to the request source via the network N. For example, when the image storage server 300 receives a request from the user terminal 500 to a predetermined storage destination in the server via the network N, it reads the composite image 310 stored in the storage destination specified in the request, includes the composite image 310 in a response, and transmits the response to the user terminal 500 via the network N.

Figure 9:
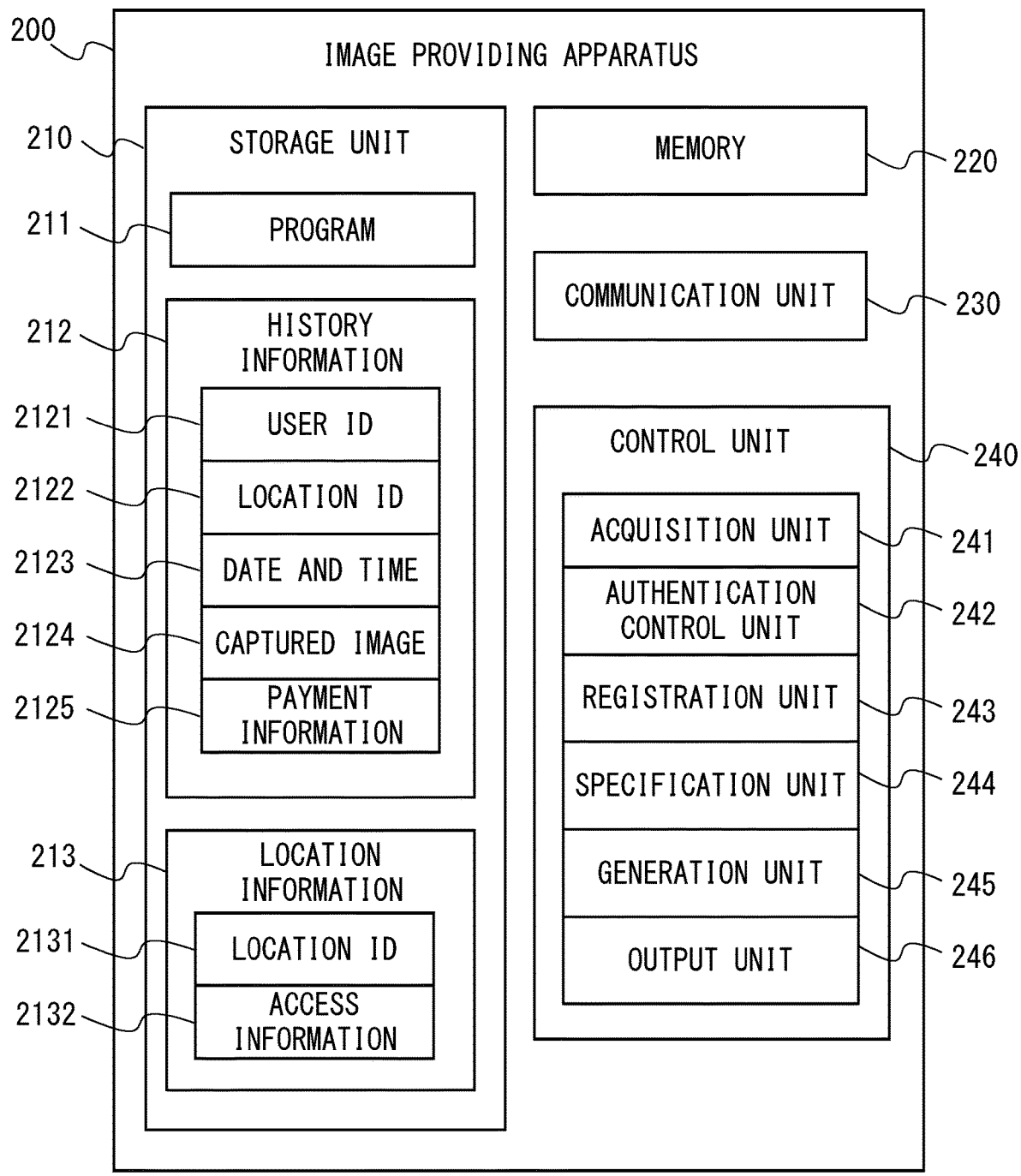
FIG. 9 is a block diagram showing a configuration of the image providing apparatus according to the second example embodiment.

Next, the image providing apparatus 200 will be described in detail. FIG. 9 is a block diagram showing the configuration of the image providing apparatus 200 according to the second example embodiment. The image providing apparatus 200 includes a storage unit 210, a memory 220, a communication unit 230, and a control unit 240. The storage unit 210 is a storage device such as a hard disk and a flash memory. The storage unit 210 stores a program 211, history information 212, and location information 213. The program 211 is a computer program in which processing of the image providing method according to the second example embodiment is implemented.

The history information 212 is an action history of the user U using the face authentication terminal at each location. That is, the history information 212 is a history of successful face authentication of the user U by the face authentication terminal 401, or the like, the payment history at each location, etc. Specifically, the history information 212 is information that associates a user ID 2121, a location ID 2122, a date and time 2123, a captured image 2124, and payment information 2125. Note that payment information 2125 is not essential. The user ID 2121 is information for identifying the user U and is a user ID included in the face authentication result when the face authentication is successful. The location ID 2122 is information for identifying the location where the face authentication terminal that captured the image for the face authentication is installed. The date and time 2123 is a date and time when the captured image for face authentication is taken or when face authentication is performed. The captured image 2124 is an image of the user U captured by the face authentication terminal installed at the location indicated by the location ID 2122. The payment information 2125 is a history of a payment made by the user U based on the face authentication by using the face authentication terminal installed at the location indicated by the location ID 2122. The payment information 2125 includes, for example, a payment amount, merchandise, and so on.

The location information 213 is information that associates the location ID 2131 of each location A0 to An with the access information 2132. The access information is an example of first access information, such as link information to WEB information corresponding to each of the locations A0 to An, specifically a URL, or the like.

The memory 220 is a volatile storage device such as RAM (Random Access Memory) and is a storage area for temporarily holding information when the control unit 240 is operating. The communication unit 230 is a communication interface with the network N.

The control unit 240 is a processor, which is, a control device, that controls each component of the image providing apparatus 200. The control unit 240 reads the program 211 from the storage unit 210 into the memory 220 and executes the program 211. Thus, the control unit 240 implements the functions of the acquisition unit 241, the authentication control unit 242, the registration unit 243, the specification unit 244, the generation unit 245, and output unit 246.

The acquisition unit 241 is an example of the acquisition unit 13 described above. The acquisition unit 241 receives the face authentication request from the face authentication terminals 401 to 40*n* via the network N, acquires the captured image included in the face authentication request, and outputs the acquired captured image to the authentication control unit 242 and the registration unit 243. The acquisition unit 241 also acquires the location ID from the received face authentication request. The acquisition unit 241 also receives the composite image request from the face authentication terminal 40*n* via the network N. The acquisition unit 241 acquires the payment history from the face authentication terminals 401 to 40*n* via the network N and outputs the payment history to the registration unit 243.

The authentication control unit 242 controls face authentication for the face area of the user U included in the captured image. That is, the authentication control unit 242 controls face authentication for the face area of the user U included in each of the plurality of captured images taken at the locations A1 to An−1. The authentication control unit 242 also controls face authentication for the face area of the user U included in the first image captured at the location An. That is, the authentication control unit 242 controls the authentication apparatus 100 to perform face authentication on the captured image acquired by the acquisition unit 241. For example, the authentication control unit 242 transmits the face authentication request including the acquired captured image to the authentication apparatus 100 via the network N and receives the face authentication result from the authentication apparatus 100. The authentication control unit 242 may detect the face area of the user U from the captured image and include the image of the face area in the face authentication request. Alternatively, the authentication control unit 242 may extract facial feature information from the face area and include the facial feature information in the face authentication request.

The registration unit 243 is an example of the registration unit 12 described above. The registration unit 243 registers a history of face authentication and payment at the location A1 or the like in the storage unit 210 as the history information 212. The registration unit 243 registers, at least in the storage unit 210, the captured image at the location where the face authentication is successful. The registration unit 243 registers the action history of the user U at each location in the storage unit 210 in association with the captured image corresponding to the location. Specifically, the registration unit 243 stores, in the storage unit 210, the user ID 2121 for which face authentication is successful, the location ID 2122 included in the face authentication request, the date and time 2123 indicating the captured time or authentication time, the captured image 2124 included in the face authentication request, and the payment information 2125 based on the face authentication, in association with each other.

The specification unit 244 is an example of the specification unit 14 described above. When the face authentication at the location An is successful, the specification unit 244 specifies the above second image from among the captured images 2124 in the history information 212. Specifically, the specification unit 244 specifies the user ID included in the face authentication result, and specifies the captured image associated with the identified user ID as the second image. Here, if the user ID is included in the face authentication result, the face authentication in the authentication apparatus 100 is successful. The user ID is the user ID 111 in the face information DB 110 of the authentication apparatus 100. Successful face authentication is achieved when the degree of match between the facial feature information extracted from the face area of the user U included in the captured image at the location An and the facial feature information 112 in the face information DB 110 is greater than or equal to a predetermined value. Therefore, it can be said that the specification unit 244 specifies, as the second image, one or more images including a face area whose degree of match with the face area of the user included in the first image is greater than or equal to the predetermined value from among the plurality of captured images.

In some cases, the user U captures a plurality of images at a single location. In this case, a plurality of the captured images 2124 are associated with the same pair of user ID 2121 and location ID 2122 in the history information 212. In this case, the date and time 2123 and the payment information 2125 of the plurality of captured images 2124 are different. Therefore, when the plurality of captured images are associated with the set of the specified user ID and location ID, the specification unit 244 selects one image per location ID as the second image. The method of selection may be any method. In this way, it is possible to prevent the composite image from being composed of captured images of one location and instead enables captured images of various locations to be included in the composite image. Therefore, it is possible to provide a memorial photo that is more desired by a user.

In addition to the case where face authentication at the location An is successful, the specification unit 244 specifies the above second image when a predetermined condition for providing the composite image (hereinafter such a condition is referred to as a provision condition) is satisfied. Here, the provision condition may be provided, for example, when the number of locations where face authentication is successful among the plurality of locations is greater than or equal to a predetermined number. In addition, the provision condition may be that the action history satisfies a first condition. That is, the history information 212 may satisfy some condition. The first condition includes, for example, that the total amount of payment history made by the user is greater than or equal to a predetermined amount. In this case, the specification unit 244 calculates the total amount of the payment information 2125 associated with the user ID 2121 for which face authentication is successful among the history information 212, and determines that the first condition is satisfied when the total amount is greater than or equal to the predetermined amount. In addition, the first condition may be that the amount of payment made based on face authentication is greater than or equal to the predetermined amount at each location. In this case, first, the specification unit 244 specifies each payment amount of the payment information 2125 associated with the user ID 2121 for which face authentication is successful among the history information 212. The specification unit 244 determines that the first condition is satisfied if each specified payment amount is greater than or equal to the predetermined amount. In other words, if the payment amount is greater than or equal to the predetermined amount at all the locations where the user visited and made payment based on face authentication (when the first condition is satisfied), the composite image may be provided. For example, this applies when a user makes a payment through a face authentication terminal installed at a shopping mall, theme park, zoo, or other facilities, and the purchase amount at each facility is X yen or more. The same applies not only to facilities but also to tourist destinations.

There may be more than one location and more than one store at each location. For example, a first location is a theme park with a plurality of stores and a second location is a shopping mall with a plurality of stores. In that case, the first condition may be that the payment amount at each store at each location is greater than or equal to a predetermined amount. Alternatively, the first condition may be that the total payment amount at each store for each location is greater than or equal to a predetermined amount. For example, if the total payment amount at three stores among ten stores present at the location A1 is 10,000 yen or more, the first condition may be satisfied. Alternatively, the first condition may be that, for each location, the highest payment amount among the affiliated stores is greater than or equal to a predetermined amount. For example, if the payment amount at one store among ten stores present at the location A1 is 10,000 yen or more, the first condition may be satisfied. Alternatively, the first condition may be that there is a payment history in all stores.

The specification unit 244 may also specify attribute information about the user U when face authentication at the location An is successful, and specify the second image when the specified attribute information satisfies a second condition. Here, the attribute information may be status information or the like of the user U. The status information is, for example, rank, grade (business/first class), etc., determined by usage, earned miles or contract, or the like, with airlines. The second condition indicates, for example, that a status is greater than or equal to a predetermined value. If the attribute information is the presence or absence of membership registration, the second condition indicates that the user is a pre-registered member. If the attribute information is a membership attribute of a theme park, the second condition may be that the user is an annual pass member. Alternatively, the attribute information may be flight information (including boarding time) of the user U. In that case, the second condition may be that the present time is more than 30 minutes before the boarding time. The time may be any time. This prevents the user U from being late for boarding. In addition, if the location An is an airport, the attribute information may be the status of completion of each procedure at the airport, such as whether check-in, baggage check, and security inspection have been completed. In this case, the second condition may be that the user has checked in, checked in his/her baggage, and been security checked at the airport, or one or more of them has been completed. Note that each procedure at the airport may be carried out based on face authentication and a history of the face authentication may be stored. In that case, a plane ticket or passport and the face information may be registered in association with each other on the management server of the airport. Therefore, the specification unit 244 may acquire the history of each procedure of the user U from the management server of the airport as the attribute information. For example, the second condition is that the user has checked in. The user U is subjected to face authentication with the signage (the face authentication terminal 40*n*) installed in the check-in lobby. At this time, the specification unit 244 acquires whether or not the user U has checked in from the management server of the airport as the attribute information. The specification unit 244 determines that the second condition and the provision condition are satisfied if the user U has checked in. This can encourage users to check in by providing a composite image to the users as an incentive.

The generation unit 245 is an example of the generation unit 15 described above. The generation unit 245 reads the second image (the captured image 2124) specified by the specification unit 244 from the history information 212, and combines the second image with a predetermined template so as to integrate them into one image to generate a composite image. Furthermore, the generation unit 245 may read the access information 2132 corresponding to the location ID 2122 associated with the specified captured image 2124 from the location information 213 and incorporate it into the corresponding captured image 2124 to generate a composite image. For example, the generation unit 245 sets the access information 2132 as a link destination in the captured image 2124. The generation unit 245 may also include, in the composite image, a capturing period obtained from a user name corresponding to the user who has succeeded in face authentication and the date and time corresponding to each captured image.

The output unit 246 is an example of the output unit 16 described above. The output unit 246 transmits the composite image generated by the generation unit 245 to a storage destination of the image storage server 300 via the network N. At this time, the generation unit 245 generates second access information indicating the storage destination of the composite image in the image storage server 300. Here, the second access information may be, for example, a two-dimensional bar code. The output unit 246 then transmits the second access information to the face authentication terminal 40*n* via the network N. That is, the output unit 246 presents the second access information to the user U. Alternatively, the output unit 246 may transmit the composite image to the face authentication terminal 40*n* via the network N.

Figure 10:
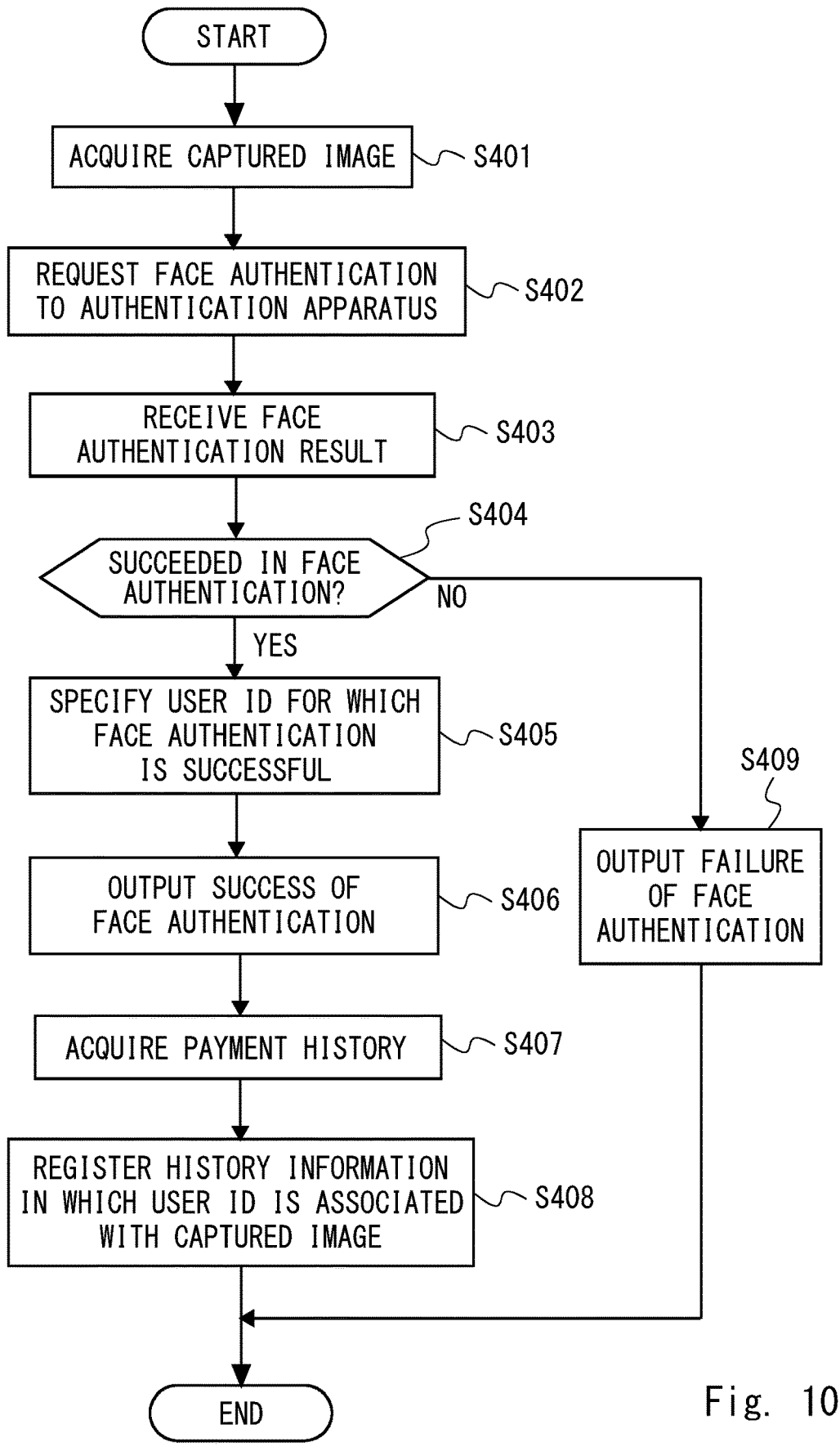
FIG. 10 is a flowchart showing a flow of captured image registration processing according to the second example embodiment.

FIG. 10 is a flowchart showing a flow of captured image registration processing according to the second example embodiment. First, the acquisition unit 241 receives a face authentication request from a request source via the network N as described above to acquire a captured image (S401). Here, the request source is any one of the face authentication terminals 401 to 40*n*-1.

Next, the authentication control unit 242 transmits the face authentication request to the authentication apparatus 100 via the network N (S402). At this time, the authentication control unit 242 includes, in the face authentication request, at least one of the captured image acquired in Step S401, the face area extracted from the captured image, and the facial feature information extracted from the face area. The authentication control unit 242 then receives the face authentication result from the authentication apparatus 100 via the network N (S403). When face authentication is successful, the face authentication result includes the user ID, while when face authentication fails, the face authentication result indicates a failure of the face authentication.

The authentication control unit 242 determines whether the face authentication is successful (S404). When it is determined that the face authentication has failed, the output unit 246 outputs the fact that the face authentication has failed (S409). Specifically, the output unit 246 transmits a message to the request source via the network N indicating failed face authentication.

If it is determined in Step S404 that the face authentication is successful, the specification unit 244 specifies the user ID for which the face authentication is successful (S405). Specifically, the specification unit 244 extracts the user ID included in the face authentication result. Next, the output unit 246 outputs the fact that the face authentication is successful (S406). Specifically, the output unit 246 transmits a message to the request source via the network N indicating successful face authentication.

After that, payment processing is performed in the face authentication terminal 401 or the like, which is the request source. The acquisition unit 241 acquires the payment history from the face authentication terminal 401 or the like via the network N (S407). Next, the registration unit 243 registers the history information 212 corresponding to the user ID specified in Step S405 and the captured image acquired in Step S401 in the storage unit 210 in association with each other (S408). In addition, the registration unit 243 registers the history information 212 by further associating the location ID included in the face authentication request, the date and time when the face authentication is successful, and the payment history acquired in Step S407.

Figure 11:
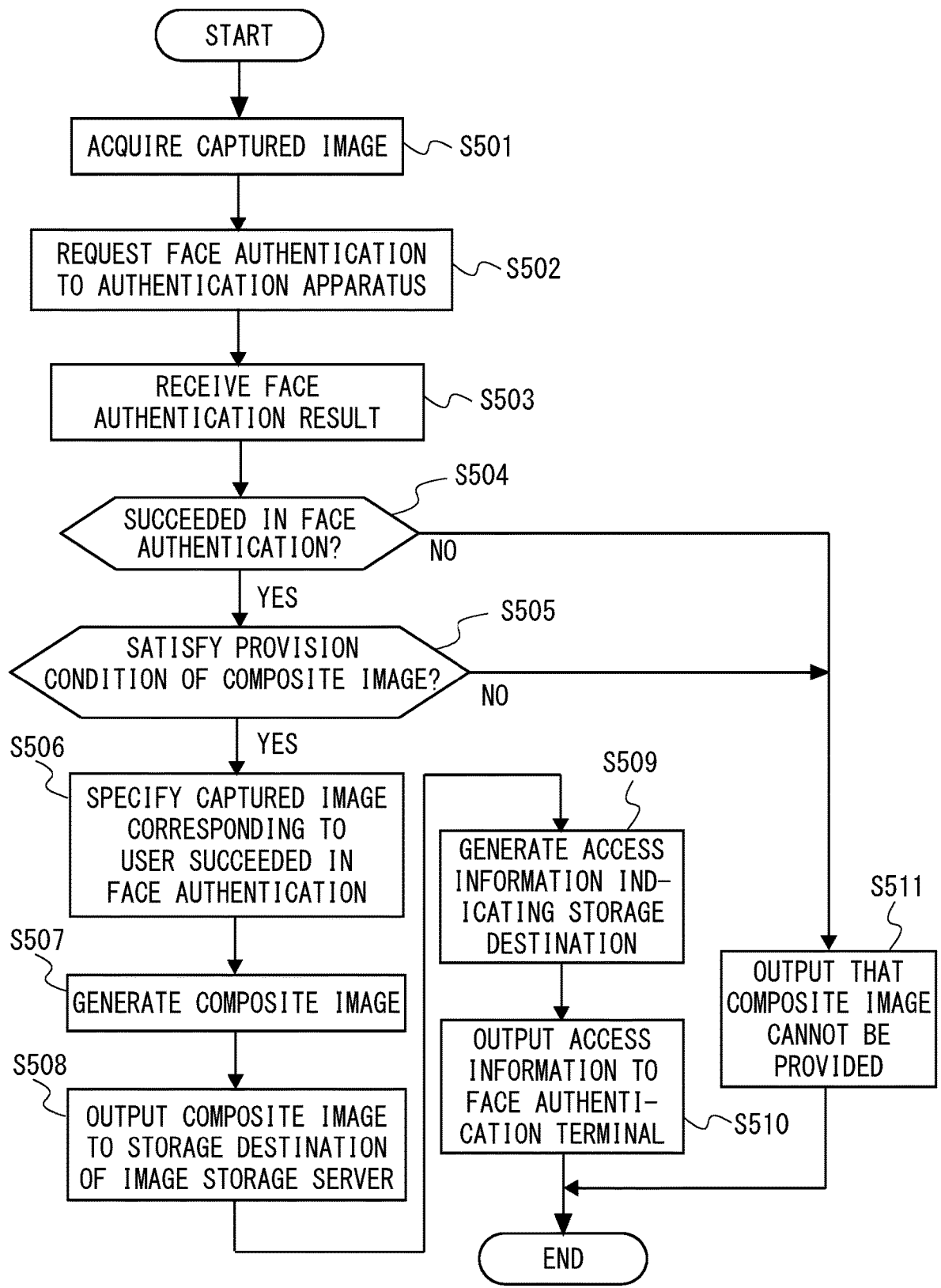
FIG. 11 is a flowchart showing a flow of image providing processing according to the second example embodiment.
Figure 12:
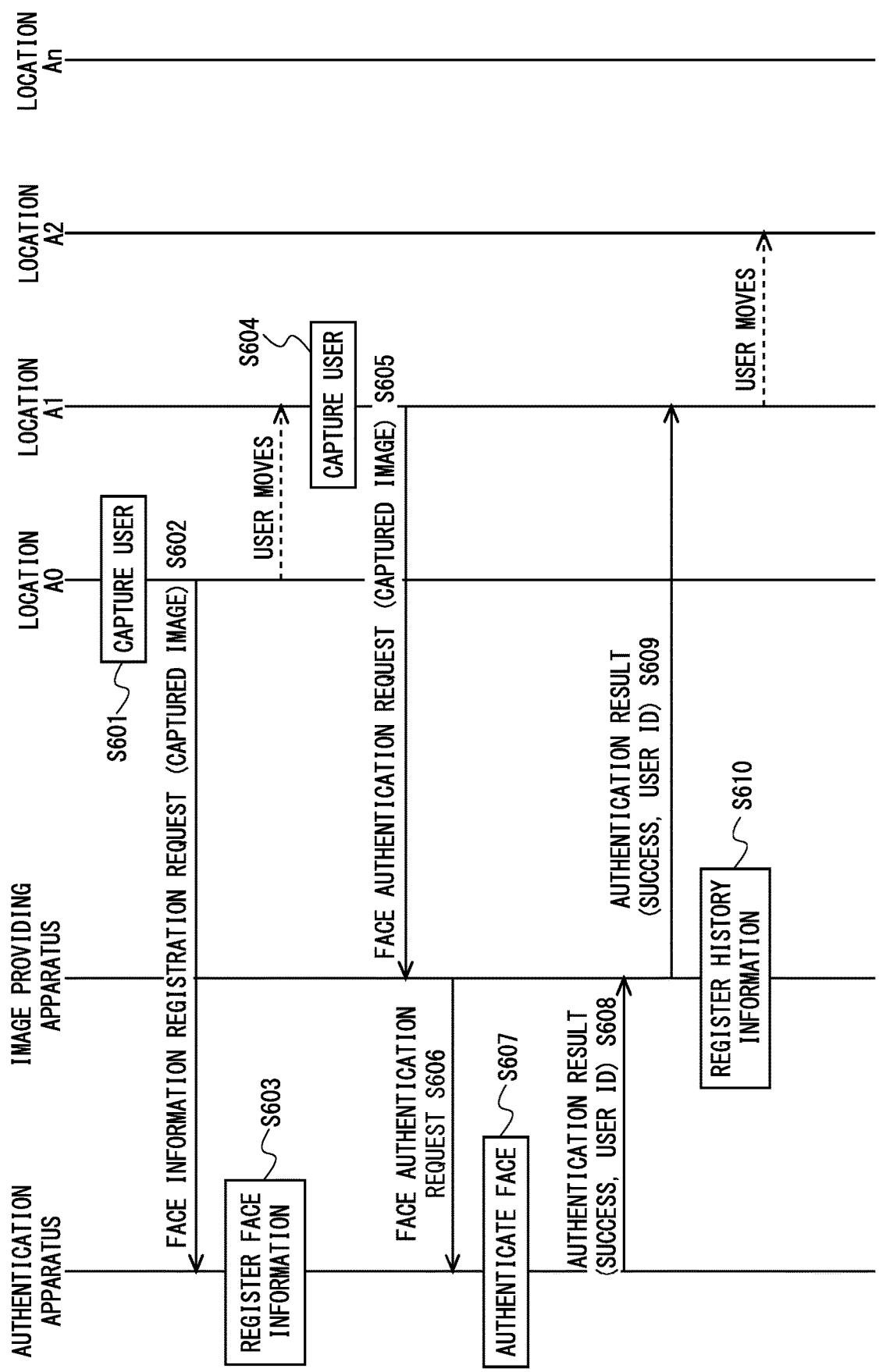
FIG. 12 is a sequence diagram showing the flow of the image providing processing according to the second example embodiment.
Figure 13:
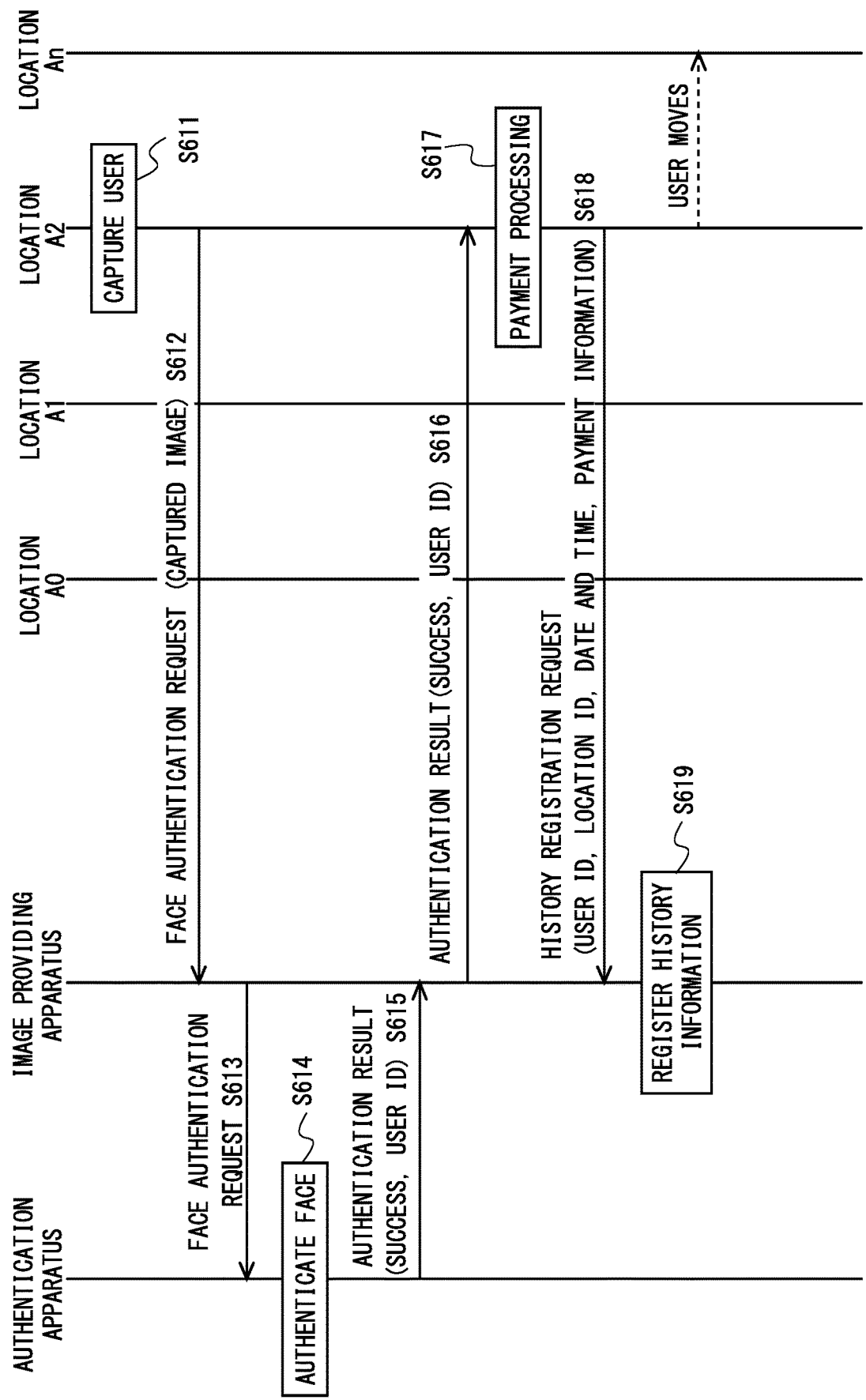
FIG. 13 is a sequence diagram showing the flow of the image providing processing according to the second example embodiment.
Figure 14:
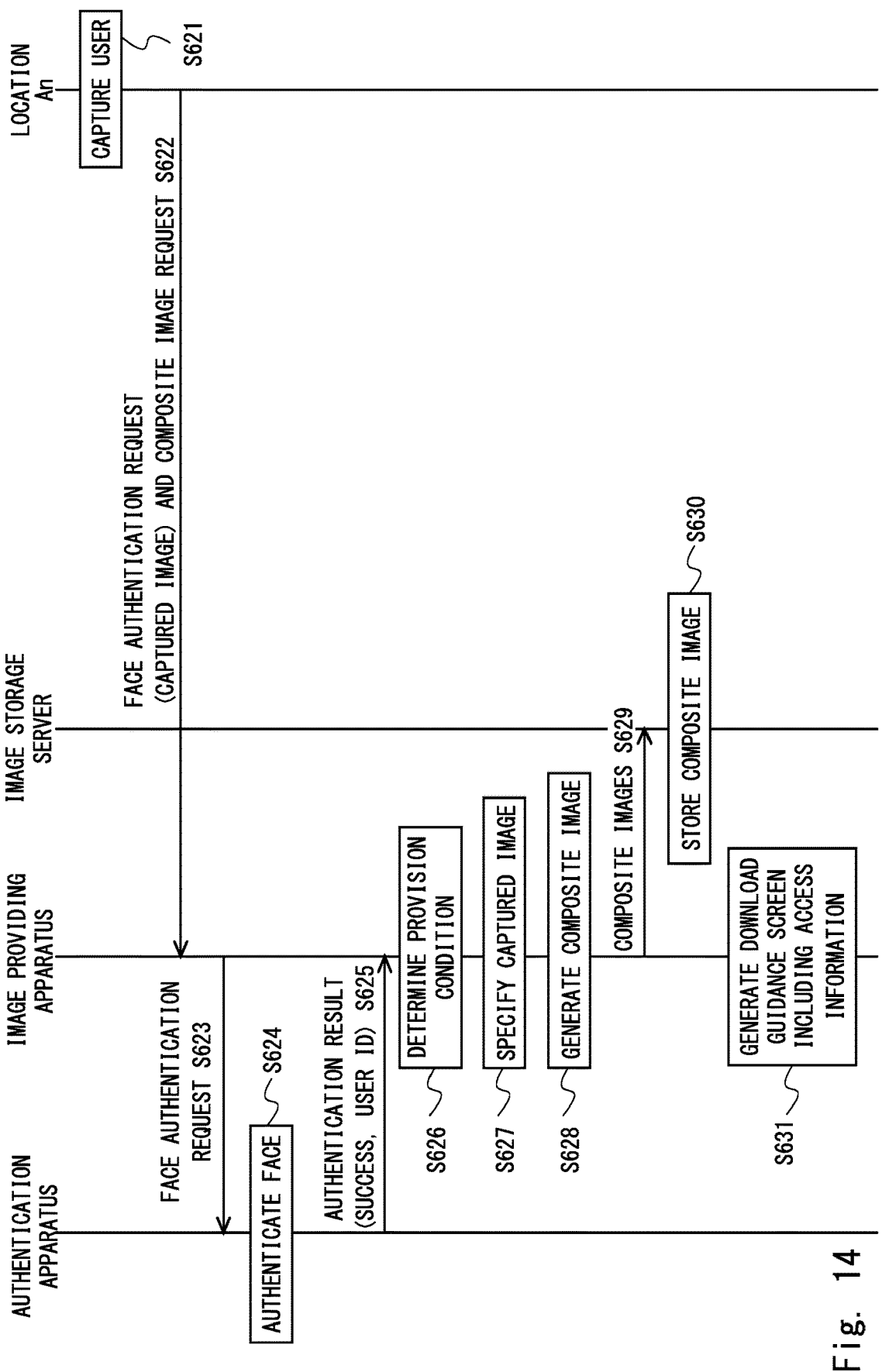
FIG. 14 is a sequence diagram showing the flow of the image providing processing according to the second example embodiment.

FIG. 11 is a flowchart showing a flow of image providing processing according to the second example embodiment. First, the acquisition unit 241 receives a face authentication request and a composite image request from the face authentication terminal 40*n* via the network N, and acquires a captured image from the face authentication request (S501).

Next, the authentication control unit 242 transmits a face authentication request to the authentication apparatus 100 via the network N (S502). At this time, the authentication control unit 242 includes, in the face authentication request, at least one of the captured image acquired in Step S501, the face area extracted from the captured image, and the facial feature information extracted from the face area. The authentication control unit 242 then receives the face authentication result from the authentication apparatus 100 via the network N (S503).

The authentication control unit 242 determines whether the face authentication is successful (S504). When it is determined that the face authentication is successful, the specification unit 244 determines whether the provision condition of the composite image is satisfied (S505). When it is determined that the provision condition is satisfied, the specification unit 244 specifies the captured image 2124 corresponding to the user ID 2121 for which face authentication is successful (S506). Next, the generation unit 245 generates a composite image by using the specified captured image 2124 (S507).

Next, the output unit 246 outputs the composite image to the storage destination of the image storage server 300 (S508). Next, the generation unit 245 generates the access information indicating the storage destination (S509). After that, the output unit 246 outputs (transmits) the access information to the face authentication terminal 40*n* via the network N (S510).

If face authentication fails in Step S504, or if it is determined in Step S505 that the provision condition is not satisfied, the output unit 246 transmits a message to the face authentication terminal 40*n* via the network N indicating that the composite image cannot be provided (S511).

FIGS. 12, 13, 14, and 15 are sequence diagrams showing a flow of the image providing processing according to the second example embodiment. First, at the location A0, the face authentication terminal 400 captures the user U (S601) and transmits a face information registration request including the captured image to the authentication apparatus 100 via the network N (S602). Next, the authentication apparatus 100 registers the face information (the facial feature information) about the user U based on the captured image included in the received face information registration request (S603). The user U then moves to the location A1.

Next, at the location A1, the face authentication terminal 401 captures the user U (S604) and transmits a face authentication request including the captured image to the image providing apparatus 200 via the network N (S605). The image providing apparatus 200 transmits a face authentication request for the face area of the user U in the captured image included in the received face authentication request to the authentication apparatus 100 via the network N (S606). Next, the authentication apparatus 100 performs face authentication for the face area of the user U in the captured image included in the received face authentication request (S607). Here, it is assumed that face authentication is successful. The authentication apparatus 100 transmits the fact that the face authentication is successful and the face authentication result including the user ID to the image providing apparatus 200 via the network N (S608). The image providing apparatus 200 transmits the face authentication result to the face authentication terminal 401 via the network N (S609). Note that the face authentication terminal 401 does not perform payment processing. Next, the image providing apparatus 200 registers the history information 212 about the user who has succeeded in face authentication in the storage unit 210 (S610). The user U then moves to the location A2.

Next, at the location A2, the face authentication terminal 402 captures the user U (S611) and transmits a face authentication request including the captured image to the image providing apparatus 200 via the network N (S612). The image providing apparatus 200 transmits a face authentication request for the face area of the user U in the captured image included in the received face authentication request to the authentication apparatus 100 via the network N (S613). Next, the authentication apparatus 100 performs face authentication for the face area of the user U in the captured image included in the received face authentication request (S614). Here, it is assumed that face authentication is successful. The authentication apparatus 100 transmits the fact that the face authentication is successful and the face authentication result including the user ID to the image providing apparatus 200 via the network N (S615). The image providing apparatus 200 transmits the face authentication result to the face authentication terminal 402 via the network N (S616). Here, the face authentication terminal 402 performs the payment processing for the user U (S617) and transmits a history registration request including the payment history to the image providing apparatus 200 via the network N (S618). The history registration request shall include, for example, the user ID, the location ID, the date and time, and the payment information. The image providing apparatus 200 generates the history information 212 based on the received history registration request and registers it in the storage unit 210 (S619). The user U then moves to the location An.

Next, at the location An, the face authentication terminal 40n photographs the user U (S621) and transmits a face authentication request and a composite image request including the captured image to the image providing apparatus 200 via the network N (S622). The image providing apparatus 200 transmits the face authentication request for the face area of the user U in the captured image included in the received face authentication request to the authentication apparatus 100 via the network N (S623). Next, the authentication apparatus 100 performs face authentication for the face area of the user U in the captured image included in the received face authentication request (S624). Here, it is assumed that face authentication is successful. The authentication apparatus 100 transmits the fact that the face authentication is successful and the face authentication result including the user ID to the image providing apparatus 200 via the network N (S625).

Next, the image providing apparatus 200 determines the provision condition (S626). Here, it is assumed that the provision condition is satisfied. Next, the image providing apparatus 200 specifies the captured image corresponding to the user who has succeeded in face authentication (S627) and generates a composite image (S628). Next, the image providing apparatus 200 transmits the composite image to the network N to the image storage server 300 (S629). The image storage server 300 stores the received composite image in a predetermined storage destination (S630). Here, the image providing apparatus 200 generates the access information indicating the storage destination of the composite image and generates a download guidance screen containing the access information (S631). Next, the image providing apparatus 200 transmits the download guidance screen to the face authentication terminal 40n via the network N (S632). In this way, the face authentication terminal 40n displays the received download guidance screen (S633).

Figure 16:
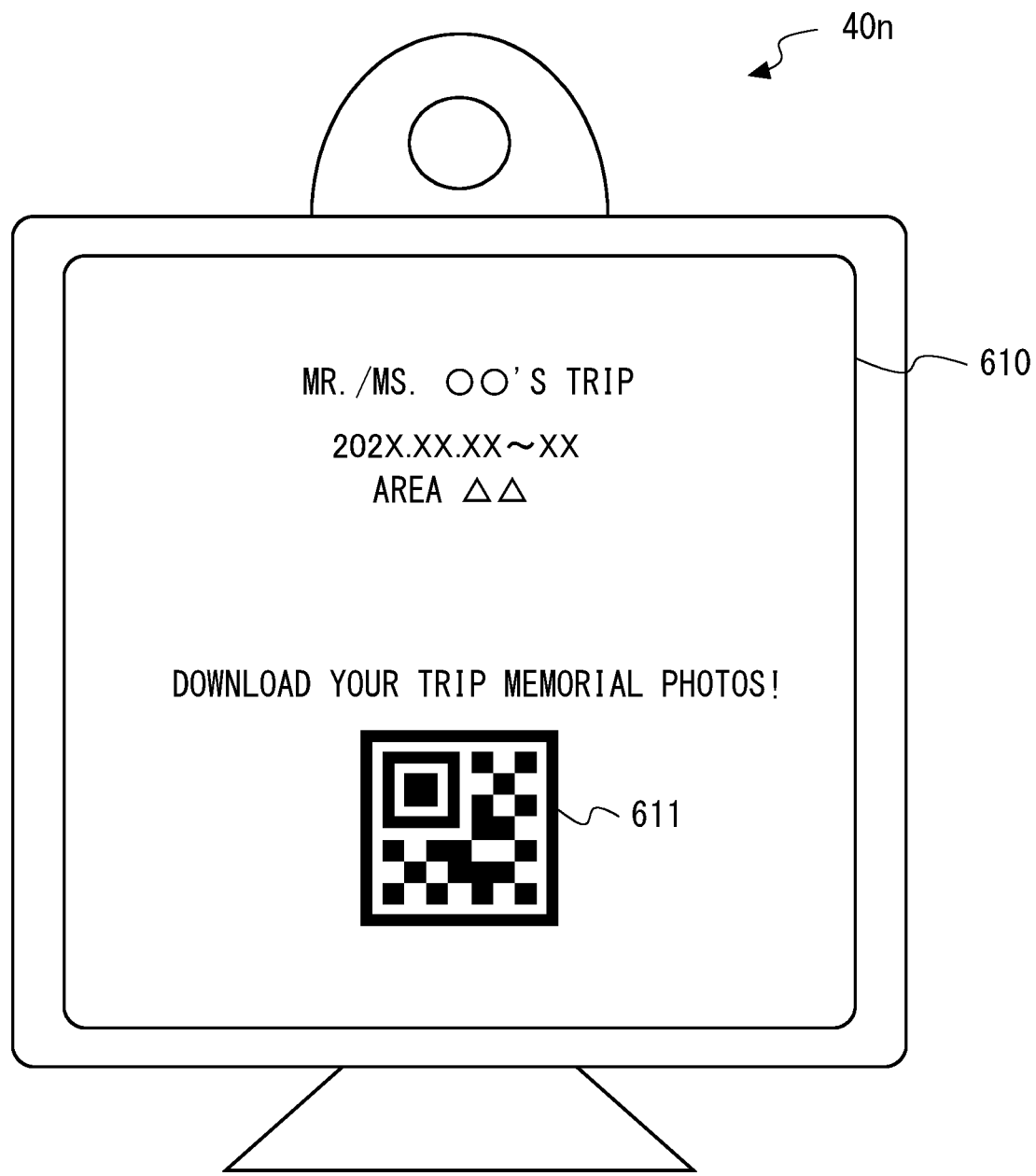
FIG. 16 shows an example of a download guidance screen according to the second example embodiment.

FIG. 16 shows an example of a download guidance screen 610 according to the second example embodiment. The download guidance screen 610 indicates that it is displayed on the face authentication terminal 40n. The download guidance screen 610 includes (second) access information 611. That is, it indicates that the access information 611 has been presented to user U.

Figure 15:
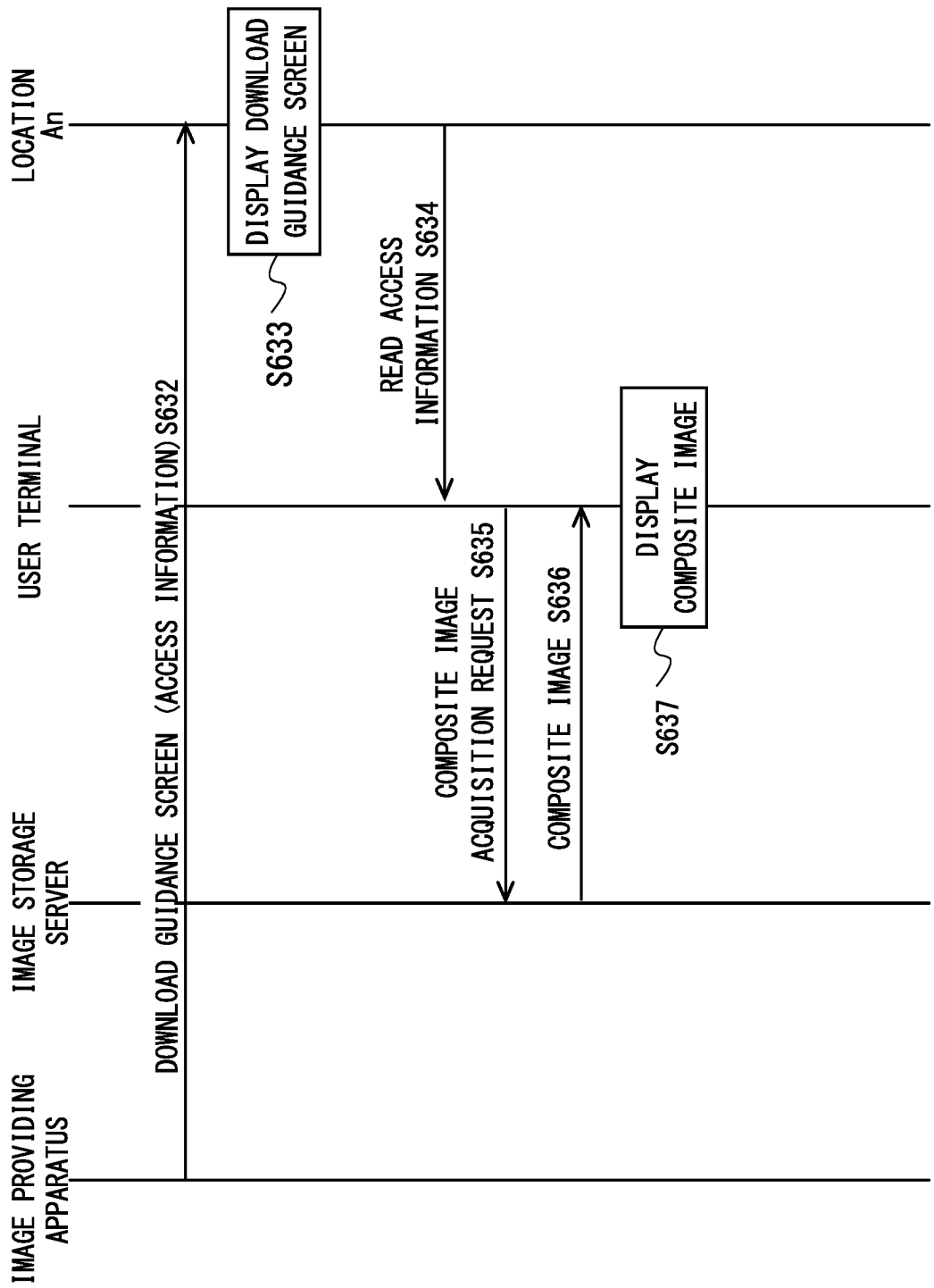
FIG. 15 is a sequence diagram showing the flow of the image providing processing according to the second example embodiment.

Here, in FIG. 15, the user terminal 500 reads the access information 611 in the download guidance screen 610 displayed on the face authentication terminal 40n in response to an operation of the user U (S634). Next, the user terminal 500 analyzes the read access information 611 and transmits a composite image acquisition request to the image storage server 300 via the network N based on the analysis result (S635). The composite image acquisition request may simply be an access (request message) from the user terminal 500 to a predetermined storage destination of the image storage server 300. The image storage server 300 reads the composite image stored in the storage destination indicated by the composite image acquisition request from the user terminal 500, and transmits a response including the composite image to the user terminal 500 via the network N (S636). The user terminal 500 displays the received composite image (S637).

Figure 17:
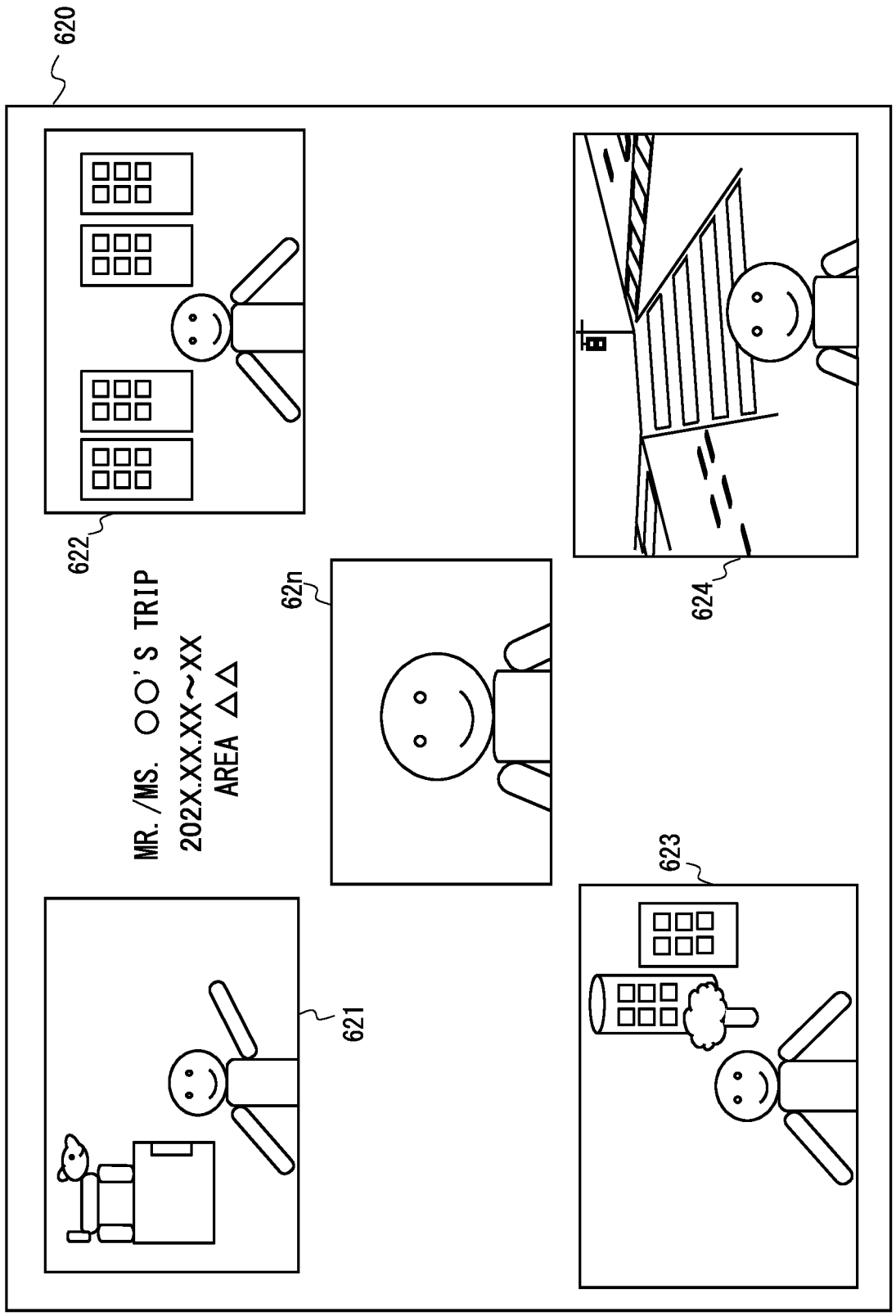
FIG. 17 shows an example of a composite image according to the second example embodiment.

FIG. 17 shows an example of a composite image 620 according to the second example embodiment. The composite image 620 includes captured images 621 to 62n together with the user U's name and the capturing period. For example, the captured image 621 is an image of the user U captured at the location A1. Similarly, the captured image 622 is an image of the user U captured at the location A2, the captured image 623 is an image of the user U captured at the location A3, the captured image 624 is an image of the user U captured at the location A4, and the captured image 62n is an image of the user U captured at the location An. Note that each captured image may have a link to a website corresponding to the captured location. This allows users to refer to the information about tourist spots at each location even after a trip, making it easier for the users to introduce actual places visited.

Note that the composite image 620 may include the access information 611. For example, the generation unit 245 generates the access information 611 in advance in Step S628 and generates the composite image 620 including the access information 611. There is also no need for the download guidance screen. In this case, in Step S631, the generation unit 245 may add the access information 611 to the composite image 620. Next, the output unit 246 transmits the composite image 620 including the access information 611 to the face authentication terminal 40n in Step S632, and the face authentication terminal 40n displays the access information 611 together with the composite image 620 in Step S633. Thus, the user U can confirm the contents of the composite image 620, and then he/she can download the composite image 620 to his/her own user terminal 500 via the access information 611.

In this manner, according to this example embodiment, when the user U is subjected to face authentication at a specific location, he/she who visits each location can acquire a composite image that aggregates the captured images taken when he/she is subjected to face authentication at each location. This makes it easier for the user U to introduce the places he/she has actually visited and to publish the composite image 620 on SNS (Social Networking Service) or the like. It is thus possible to promote visits to each location, thereby contributing to economic revitalization.

In addition, since such a composite image can be acquired as a travel memorial photo, it is possible to facilitate the user U to pre-register his/her face information at the location A0. It is also possible to contribute to spread of a stamp rally based on face authentication. Furthermore, it is possible to promote users to visit more locations and make a payment at each location by the provision condition of composite images.

Third Example Embodiment

Figure 18:
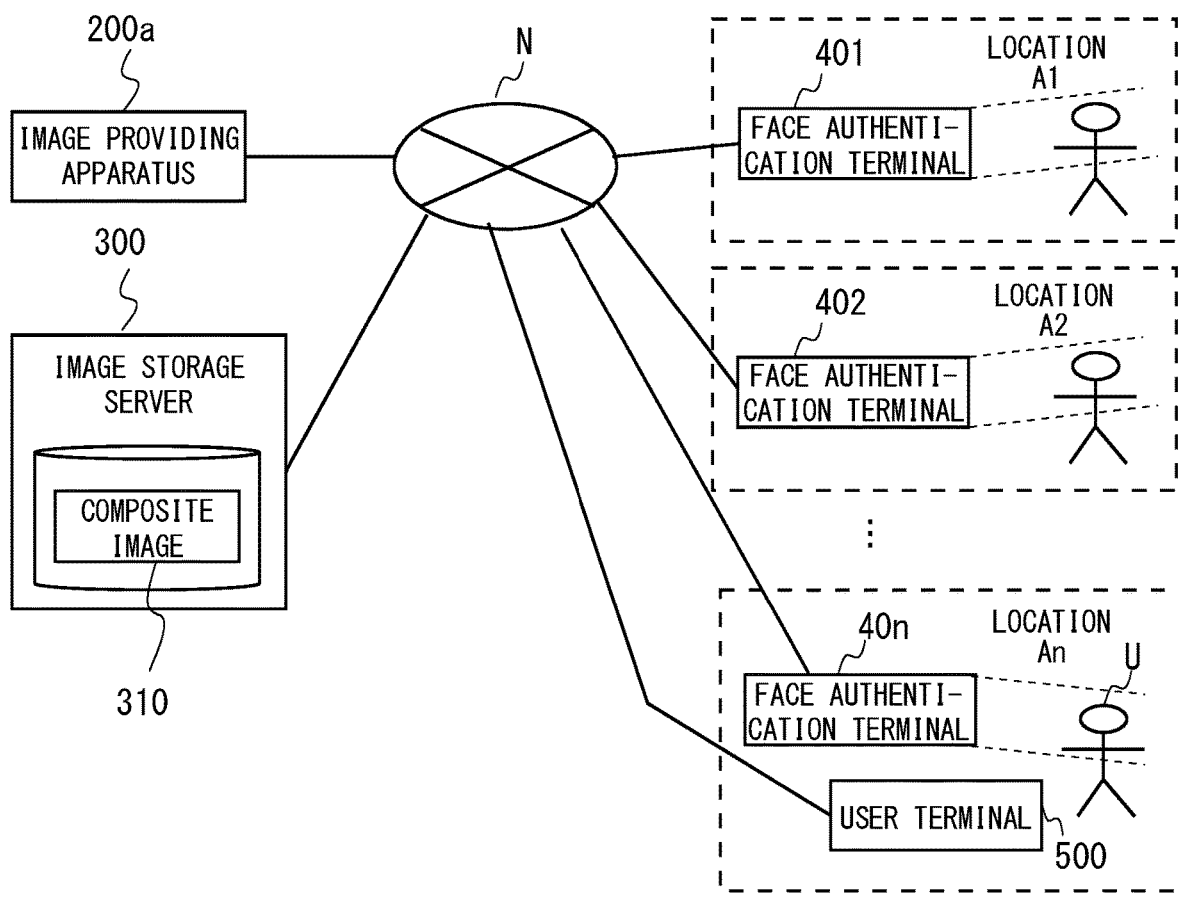
FIG. 18 is a block diagram showing an overall configuration of an image providing system according to a third example embodiment.

A third example embodiment is a modified example of the second example embodiment described above and does not require pre-registration of facial feature information. FIG. 18 is a block diagram showing an overall configuration of an image providing system 2000 according to the third example embodiment. In the image providing system 2000, compared with the image providing system 1000 described above, the authentication apparatus 100 and the face authentication terminal 400 are removed, and the image providing apparatus 200 is replaced with an image providing apparatus 200a. Since the configuration other than the image providing apparatus 200a is the same as that according to the second example embodiment, repeated descriptions are omitted as appropriate. Here, the location A0 for pre-registration of the facial feature information becomes unnecessary, and the location A1 becomes a starting location of a stamp rally.

Figure 19:
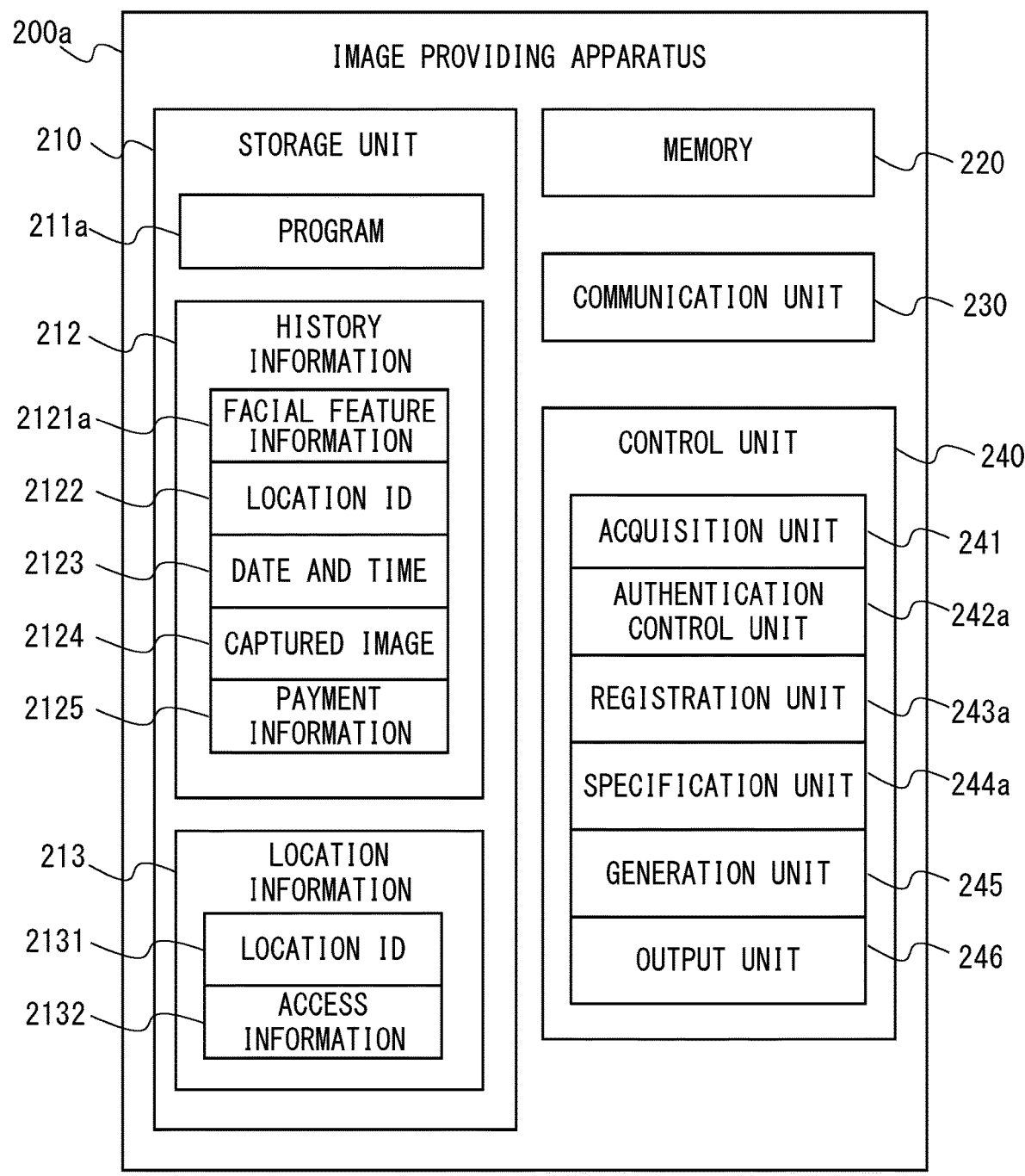
FIG. 19 is a block diagram showing a configuration of an image providing apparatus according to the third example embodiment.

FIG. 19 is a block diagram showing a configuration of the image providing apparatus 200a according to the third example embodiment. The image providing apparatus 200a differs from the image providing apparatus 200 described above in a program 211a, a facial feature information 2121a, an authentication control unit 242a, a registration unit 243a, and a specification unit 244a. The program 211a is a computer program in which processing of the image providing method according to the third example embodiment is implemented.

The facial feature information 2121a is the facial feature information about the user U extracted from the captured image of each location. That is, the history information 212 in this example embodiment uses the facial feature information as an example of a user ID.

The registration unit 243a extracts the facial feature information from the face area of the user U included in each of the plurality of captured images, and registers, in the history information 212, the extracted facial feature information 2121a and the extracted captured image 2124 from which the facial feature information 2121a is extracted in association with each other. The authentication control unit 242a extracts the facial feature information from the face area of the user U included in the captured image taken at a specific location and collates the extracted facial feature information with the facial feature information registered in the history information 212. The registration unit 243a specifies, as the second image, a captured image associated with the facial feature information whose degree of match with the facial feature information extracted from the face area of the user U included in the first image is greater than or equal to a predetermined value.

Figure 20:
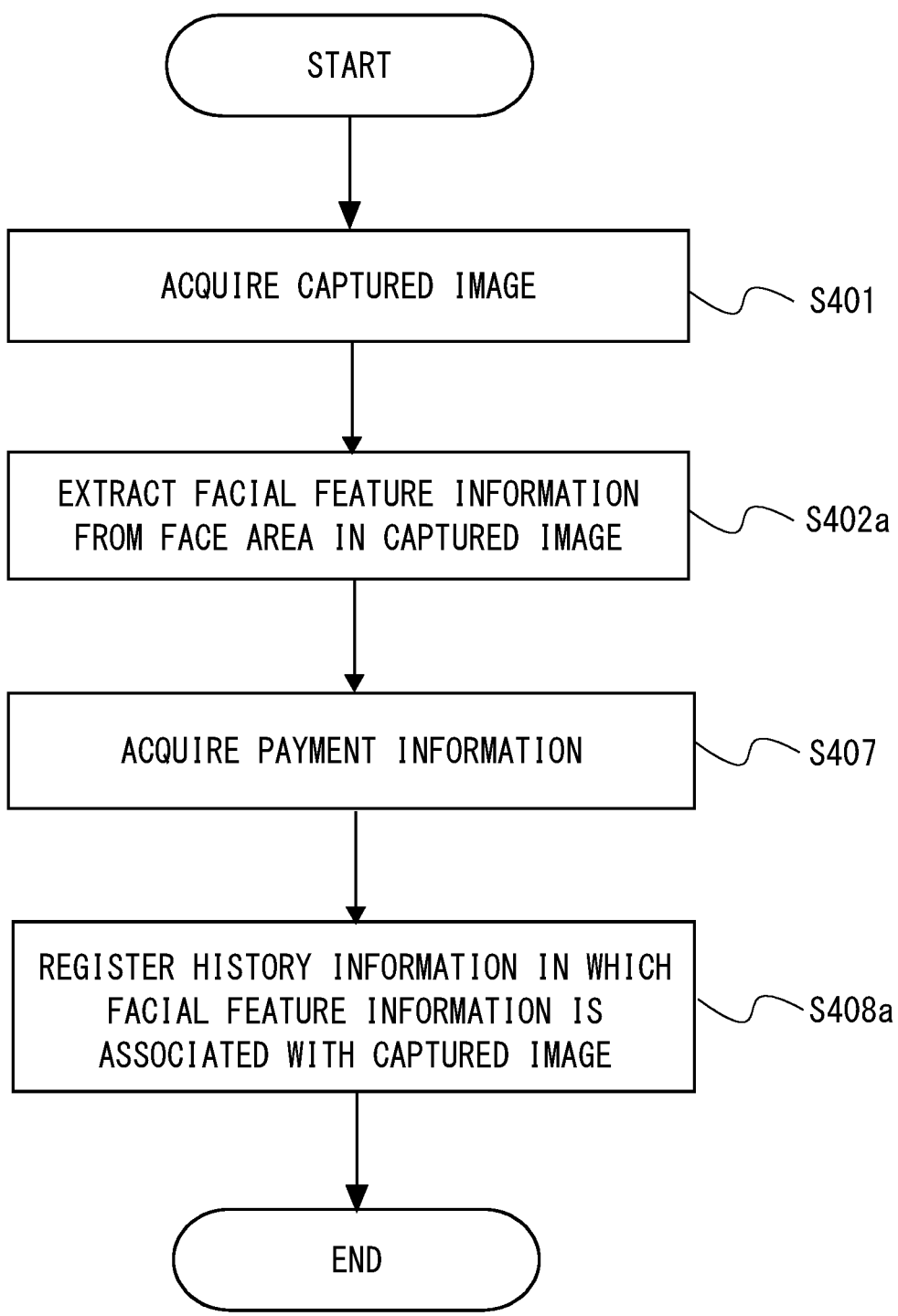
FIG. 20 is a flowchart showing a flow of captured image registration processing (registration of facial feature information) according to the third example embodiment.

FIG. 20 is a flowchart showing a flow of captured image registration processing (registration of the facial feature information) according to the third example embodiment. First, the acquisition unit 241 receives a face authentication request from a request source via the network N as described above to acquire a captured image (S401). Here, the request source is any one of the face authentication terminals 401 to 40n-1.

Next, the registration unit 243a extracts the facial feature information from the face area in the acquired captured image (S402a). Here, the face authentication terminal 401 or the like performs electronic payment and transmits the payment history to the image providing apparatus 200a. Next, the acquisition unit 241 acquires the payment history from the request source (S407). That is, in this example embodiment, a payment based on face authentication is not made. Next, the specification unit 244a registers the history information 212 that associates the extracted facial feature information with the captured image and the payment history in the storage unit 210 (S408a).

As described above, in this example embodiment, the image providing apparatus 200a extracts the facial feature information each time the captured image is taken by each of the face authentication terminals 401 at 40n-1, and registers the facial feature information in the history information 212 instead of the user ID.

Figure 21:
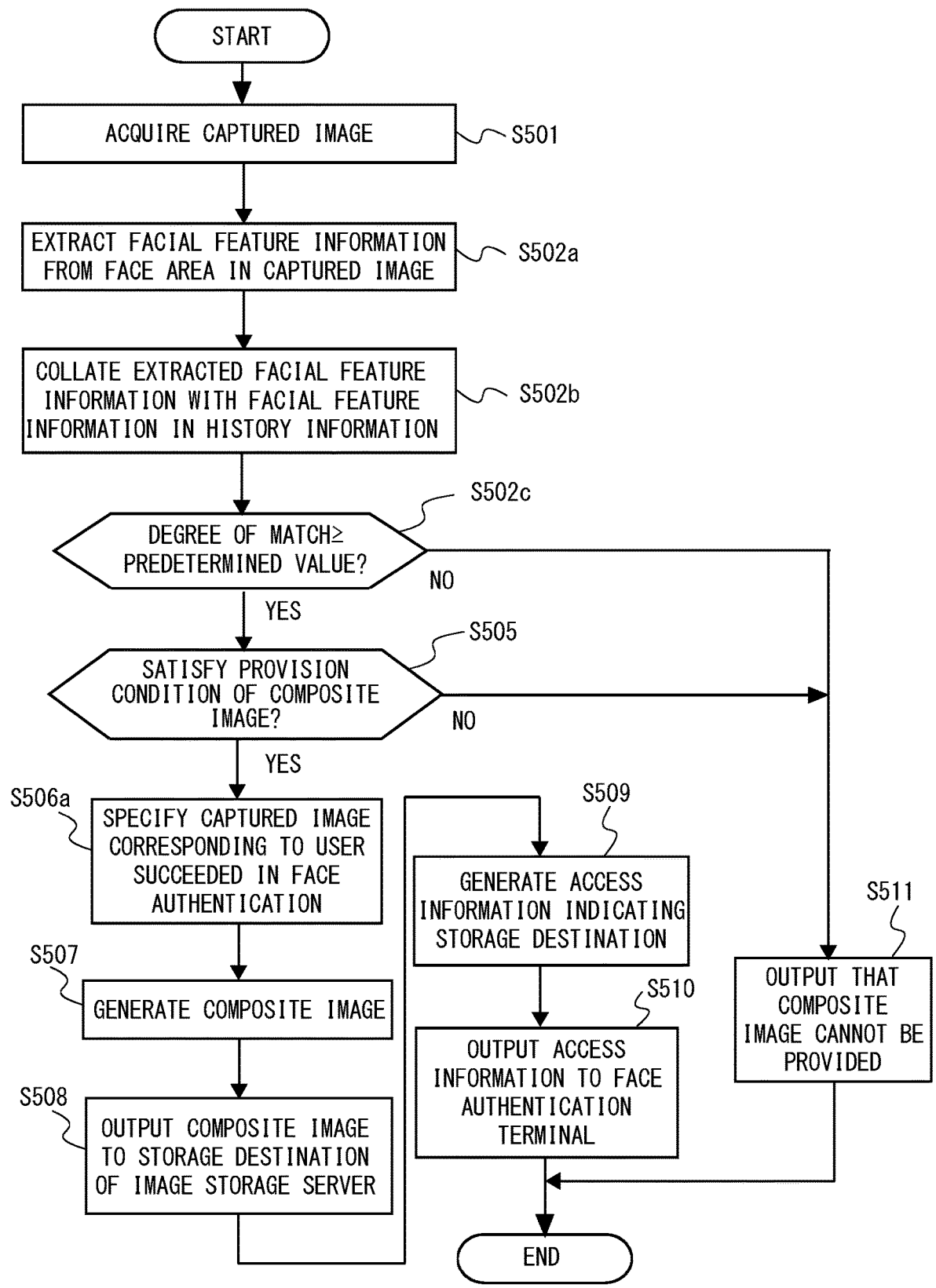
FIG. 21 is a flowchart showing a flow of image providing processing according to the third example embodiment.

FIG. 21 is a flowchart showing a flow of image providing processing according to the third example embodiment. Here, the differences from FIG. 11 are mainly explained. After Step S501, the authentication control unit 242a extracts the facial feature information from the face area in the captured image (captured by the face authentication terminal 40n at the location An) (S502a).

The authentication control unit 242a then collates the extracted facial feature information with the facial feature information 2121a in the history information 212 (S502b).

The authentication control unit 242a determines whether the degree of match between the two pieces of the facial feature information is greater than or equal to a predetermined value (S502c). When it is determined that the degree of match is greater than or equal to the predetermined value, the specification unit 244a determines whether the provision condition of the composite image is satisfied (S505). When it is determined that the provision condition is satisfied, the specification unit 244a specifies the captured image 2124 associated with the facial feature information 2121a whose degree of match with the facial feature information extracted in Step S502a is greater than or equal to a predetermined value (S506a). The subsequent processing is the same as that in FIG. 11.

Thus, in this example embodiment, the user U who visits each location can acquire a composite image that aggregates the captured images taken at respective locations by collating his/her face at a specific location. In addition, unlike the second example embodiment, pre-registration of facial feature information is unnecessary, which can contribute to the spread of a stamp rally.

Fourth Example Embodiment

A fourth example embodiment is a modified example of the second and third example embodiments described above, and does not require pre-registration of facial feature information. Specifically, the location A1 is set as a starting location of a stamp rally, and facial feature information extracted from a captured image at the location A1 is used to perform face authentication at subsequent locations. Since the image providing system 2000 and the image providing apparatus 200a according to the fourth example embodiment are equivalent to those in FIGS. 18 and 19, illustration and description thereof are omitted. In the fourth example embodiment, the image providing apparatus 200a performs captured image registration processing (registration of facial feature information) of FIG. 20 described above on the captured images taken by the face authentication terminal 401 installed at the location A1. On the other hand, for the captured images taken by the face authentication terminals 402 to 40n-1 installed at the locations A2 to An-1, respectively, the image providing apparatus 200a performs the following captured image registration processing (collation of the facial feature information).

Figure 22:
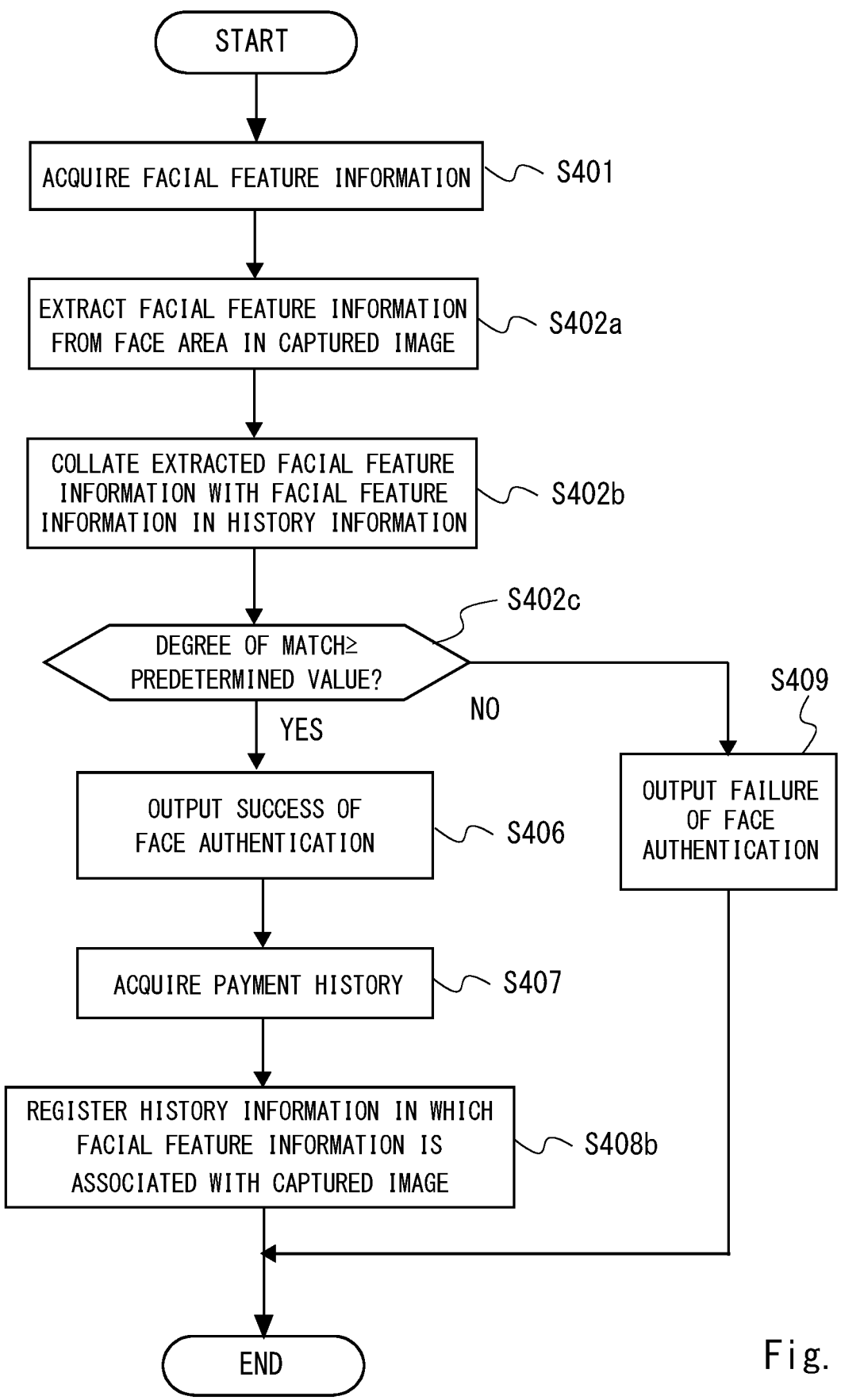
FIG. 22 is a flowchart showing a flow of captured image registration processing (collation of facial feature information) according to a fourth example embodiment.

FIG. 22 is a flowchart showing a flow of the captured image registration processing (collation of facial feature information) according to the fourth example embodiment.

It is assumed that the user U has been captured by the face authentication terminal 401 at the location A1, and that the image providing apparatus 200a has registered the history information 212 with which the facial feature information 2121a of the user U is associated. It is also assumed that the user U has been captured by the face authentication terminal 402 at the location A2.

After Step S401, the authentication control unit 242a extracts the facial feature information from the face area in the acquired captured image (S402a). The authentication control unit 242a then collates the extracted facial feature information with the facial feature information 2121a in the history information 212 (S402b).

The authentication control unit 242a determines whether the degree of match between the two pieces of the facial feature information is greater than or equal to a predetermined value (S402c). When it is determined that the degree of match is greater than or equal to the predetermined value, Steps S406 and S407 described above are performed. Next, the registration unit 243a registers the history information 212 in which the extracted facial feature information is associated with the captured image and the payment history in the storage unit 210 (S408b). Instead of the facial feature information extracted in Step S402a, the registration unit 243a may register the facial feature information extracted from the captured image at the location A1 and registered with the captured image acquired in Step S401 in the storage unit 210 as the history information 212 in association with each other. If it is determined in Step S402c that the degree of match is less than the predetermined value, the registration unit 243a may register the history information 212 in which the extracted facial feature information is associated with the captured image and the payment history in the storage unit 210 as in Step S408b. That is, even if the face information is not registered at the location A1, the face information is registered when the face authentication terminal is used for the first time at a subsequent location. The flow of image providing processing according to the fourth example embodiment is the same as that in FIG. 21.

Thus, in this example embodiment, the image providing apparatus 200a extracts the facial feature information each time the captured image is taken by each of the face authentication terminals 401 to 40n-1. However, the image providing apparatus 200a performs face authentication on a captured image taken by a face authentication terminal other than the face authentication terminal 401 at the location A1, that is, by any of the face authentication terminals 402 to 40n-1. In this way, the stamp rally based on face authentication can be achieved without pre-registration.

This example embodiment can also be expressed as follows. That is, the registration means extracts first facial feature information about the user from the first captured image taken at a first location from among the plurality of locations, registers the first captured image and the first facial feature information in the storage means in association with each other. At a second location from among the plurality of locations, the registration means registers second facial feature information about the user from a second captured image taken after the first captured image, and when a degree of match between the second facial feature information and the first facial feature information is greater than or equal to a predetermined value, the registration means registers the second captured image in the storage means in association with the first facial feature information. The authentication control means determines that the facial authentication is successful when a degree of match between third facial feature information extracted from the face area of the user included in the first image and the first facial feature information is greater than or equal to a predetermined value. The specification means specifies, when the facial authentication is successful, each of the first captured image and the second captured image associated with the first facial feature information as the second image from among the plurality of captured images.

Fifth Example Embodiment

Figure 23:
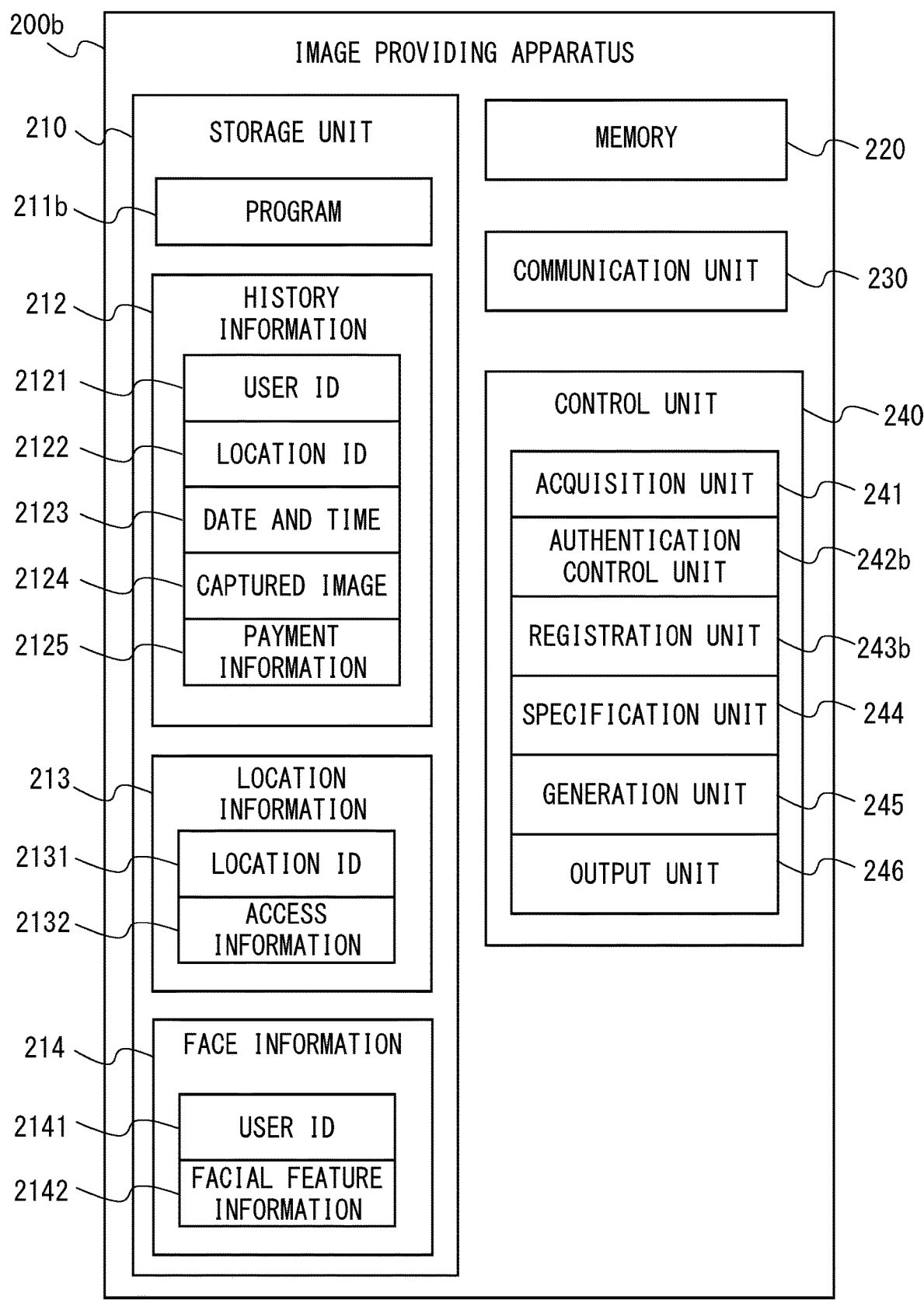
FIG. 23 is a block diagram showing a configuration of an image providing apparatus according to a fifth example embodiment.

A fifth example embodiment is a modified example of the second example embodiment described above. FIG. 23 is a block diagram showing a configuration of an image providing apparatus 200b according to the fifth example embodiment. The image providing apparatus 200b differs from the image providing apparatus 200 described above in a program 211b, face information 214, an authentication control unit 242b, and registration unit 243b. The program 211b is a computer program in which processing of the image providing method according to the fifth example embodiment is implemented.

The face information 214 corresponds to the face information DB 110 of the authentication apparatus 100 described above, and a plurality of user IDs 2141 are associated with the facial feature information 2142.

The authentication control unit 242b controls face authentication by collating facial feature information extracted from the face area of the user included in the acquired captured image with the facial feature information 2142 stored in the storage unit 210.

In addition to the functions of the registration unit 243, the registration unit 243b has functions equivalent to the face detection unit 120, the feature point extraction unit 130, and the registration unit 140. That is, the registration unit 243b detects the face area from the captured image included in the face information registration request received from the face authentication terminal 400 or the like, extracts the facial feature information, issues a user ID, and registers the face information 214 in which the user ID 2141 is associated with the facial feature information 2142 in the storage unit 210.

Figure 24:
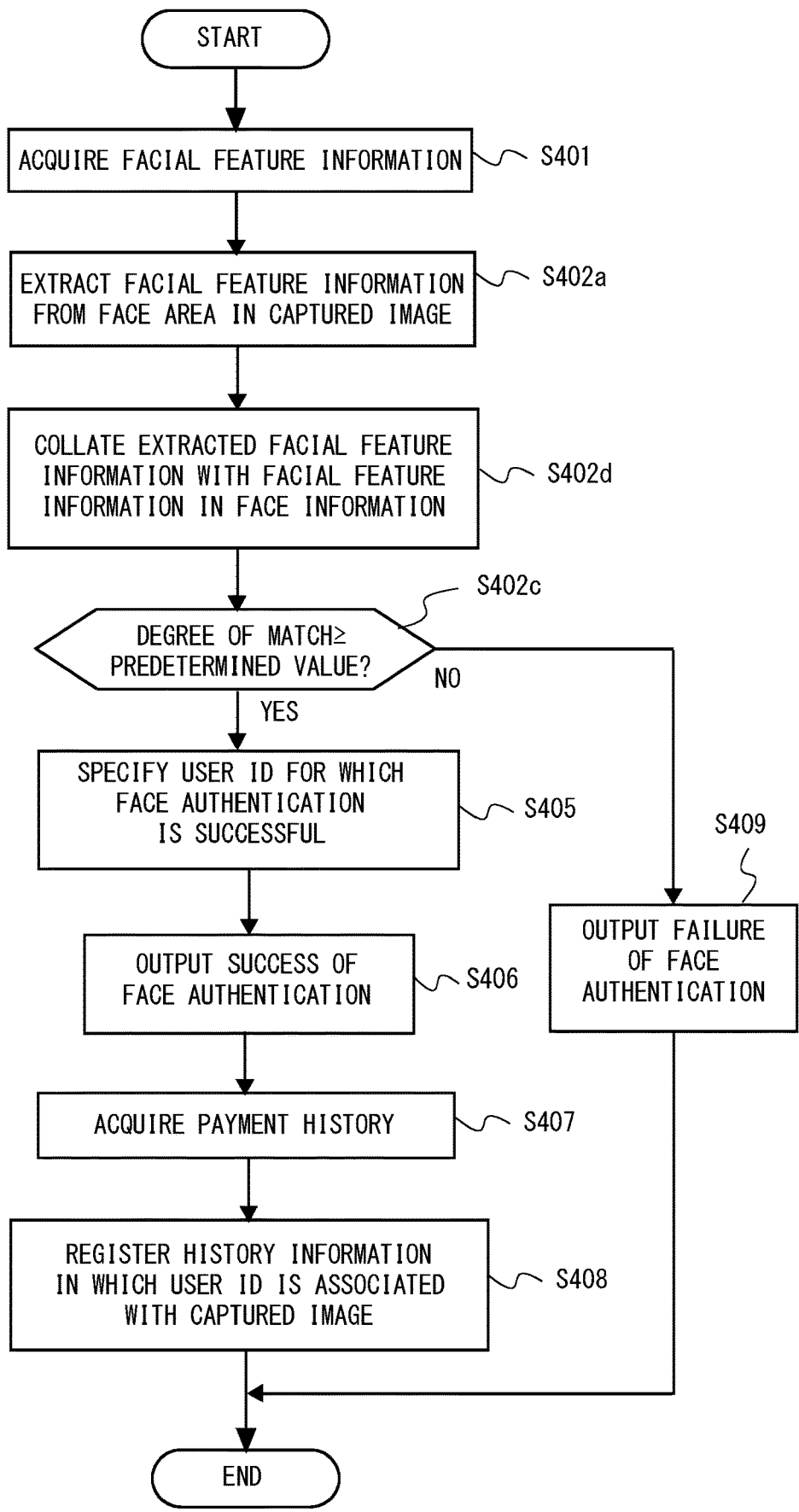
FIG. 24 is a flowchart showing a flow of captured image registration processing (collation of facial feature information) according to the fifth example embodiment.

FIG. 24 is a flowchart showing a flow of captured image registration processing (collation of facial feature information) according to the fifth example embodiment. In FIG. 24, Steps S402 to S404 in FIG. 10 described above are replaced by Steps S402a, S402d, and S402c.

After Step S401, the authentication control unit 242b extracts the facial feature information from the face area in the acquired captured image (S402a). The authentication control unit 242b then collates the extracted facial feature information with the facial feature information 2142 in the face information 214 (S402d).

The authentication control unit 242b determines whether the degree of match between the two pieces of the facial feature information is greater than or equal to a predetermined value (S402c). When it is determined that the degree of match is greater than or equal to the predetermined value, Steps S405, S406, and S407 described above are performed. Next, the registration unit 243b registers the history information 212 corresponding to the user ID specified in Step S405 and the captured image acquired in Step S401 in the storage unit 210 (S408).

In the image providing processing according to this example embodiment, Steps S402a, S402d, and S402c described above are performed instead of Steps S502, S503, and S504 in FIG. 11. That is, the authentication control unit 242b controls face authentication by collating the facial feature information extracted from the face area of the user included in the first image with the facial feature information 2142 stored in the storage unit 210. When it is determined that the provision condition is satisfied, the specification unit 244b specifies the user ID 2141 for which face authentication is successful from the face information 214.

In this way, the same effect can be achieved in the fifth example embodiment as that in the second example embodiment described above.

Other Example Embodiment

Note that each of the above example embodiments may be changed as follows. For example, the face authentication terminal 40n installed at the location An may be equipped with a smile engine that determines whether or not a user included in a captured image taken by the camera 410 is smiling. In this case, when it is determined that the user is smiling, the face authentication terminal 40n includes a captured image in a face authentication request and transmits the face authentication request to the image providing apparatus 200 or the like via the network N. The smile engine may also set a smiling point according to the degree of smiling. In that case, the face authentication terminal 40n includes the smiling point in the face authentication request.

Alternatively, the image providing apparatus 200 may be equipped with a smile engine. In this case, the image providing apparatus 200 performs face authentication when a user included in the captured image included in the face authentication request received from the face authentication terminal 401 or the like is smiling. When a composite image is generated, the image providing apparatus 200 may select a photo frame (template) corresponding to the smiling point and use it for generating the composite image.

In the above example embodiments, the configuration of the hardware has been described, but the present disclosure is not limited to this. The present disclosure can also be achieved by causing a CPU to execute a computer program for any processing.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R, CD-R/W, DVD (Digital Versatile Disc), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above example embodiments and may be changed as appropriate without departing from the scope. In addition, the present disclosure may be implemented by combining the respective example embodiments as appropriate.

The whole or part of the example embodiments disclosed above can be described as, but not limited to, the following supplementary notes.

(Supplementary Note A1)
An image providing apparatus comprising:
registration means for registering a plurality of captured images of a predetermined user taken at a plurality of locations, respectively, in storage means;
acquisition means for acquiring a first image of the user captured at a specific location;
specification means for specifying one or more second images including a face area whose degree of match with a face area of the user included in the first image is greater than or equal to a predetermined value from among the plurality of captured images;
generation means for generating a composite image including the specified second image; and
output means for outputting the composite image.

(Supplementary Note A2)
The imaging providing apparatus according to Supplementary note A1, further comprising:
authentication control means for controlling face authentication for the face area of the user included in the first image, wherein
the specification means specifies the second image when the face authentication is successful.

(Supplementary Note A3)
The image providing apparatus according to Supplementary note A2, wherein
the authentication control means controls the face authentication by using an authentication apparatus configured to store facial feature information about a plurality of persons.

(Supplementary Note A4)
The image providing apparatus according to Supplementary note A2, wherein
the storage means stores the facial feature information about the plurality of persons, and
the authentication control means controls the face authentication by collating the facial feature information extracted from the face area of the user included in the first image with the facial feature information stored in the storage means.

(Supplementary Note A5)
The image providing apparatus according to any one of Supplementary notes A2 to A4, wherein
the authentication control means controls the face authentication for the face area of the user included in each of the plurality of captured images, and
the registration means registers the captured image at the location where the face authentication is successful in the storage means.

(Supplementary Note A6)
The image providing apparatus according to Supplementary note 5, wherein
the specification means specifies the second image when the face authentication is successful at the specified location and the number of locations where the face authentication is successful from among the plurality of locations is greater than or equal to a predetermined number.

(Supplementary Note A7)
The image providing apparatus according to Supplementary note A2, wherein
the registration means extracts first facial feature information about the user from the first captured image taken at a first location from among the plurality of locations, registers the first captured image and the first facial feature information in the storage means in association with each other, at a second location from among the plurality of locations, the registration means registers second facial feature information about the user from a second captured image taken after the first captured image, and when a degree of match between the second facial feature information and the first facial feature information is greater than or equal to a predetermined value, the registration means registers the second captured image in the storage means in association with the first facial feature information, the authentication control means determines that the facial authentication is successful when a degree of match between third facial feature information extracted from the face area of the user included in the first image and the first facial feature information is greater than or equal to a predetermined value, and the specification means specifies, when the facial authentication is successful, each of the first captured image and the second captured image associated with the first facial feature information as the second image from among the plurality of captured images.

(Supplementary Note A8)

The image providing apparatus according to any one of Claims A2 to A7, wherein the registration means registers an action history of the user at each location in the storage means in association with the captured image corresponding to the location, and the specification means specifies the second image when the face authentication is successful at the specific location and the action history satisfies a first condition.

(Supplementary Note A9)

The image providing apparatus according to Claim A8, wherein the first condition is that a payment history of the user is greater than or equal to a predetermined amount.

(Supplementary Note A10)

The image providing apparatus according to any one of Claims A2 to A9, wherein the specification means specifies attribute information of the user when the face authentication is successful, and the specification means specifies the second image when the specified attribute information satisfies a second condition.

(Supplementary Note A11)

The image providing apparatus according Supplementary note A1, wherein the registration means extracts facial feature information from the face area of the user included in each of the plurality of captured images, and stores the extracted facial feature information and the captured image from which the facial feature information is extracted in the storage means in association with each other, and the specification means specifies the captured image associated with the facial feature information whose degree of match with the facial feature information extracted from the face area of the user included in the first image is greater than or equal to a predetermined value as the second image.

(Supplementary Note A12)

The image providing apparatus according to any one of Supplementary notes A1 to A11, wherein the storage means further stores first access information for each of the plurality of locations, the generation means acquires the first access information for the location where the specified second image is captured from the storage means, and the generation means incorporates the acquired first access information into the specified second image to generate the composite image.

(Supplementary Note A13)

The image providing apparatus according to any one of Supplementary notes A1 to A12, wherein the output means outputs the composite image to the storage destination, the generation means generates second access information indicating the storage destination of the composite image, and the output means presents the second access information to the user.

(Supplementary Note A14)

The image providing apparatus according to any one of Supplementary notes A1 to A13, wherein the specific location is an airport boarding gate.

(Supplementary Note A15)

The image providing apparatus according to any one of Supplementary notes A1 to 13, wherein the specific location is an exit of a theme park.

(Supplementary Note B1)

An image providing system comprising:

a plurality of first imaging devices installed at a plurality of locations, respectively;

a second imaging device installed at a specific location; and an image providing apparatus connected to the plurality of first imaging devices and the second imaging device, wherein the image providing apparatus comprises:

storage means;

registration means for registering a plurality of captured images of a predetermined user taken by the plurality of first imaging devices, respectively, in the storage means;

acquisition means for acquiring a first image of the user captured by the second imaging device;

specification means for specifying one or more second images including a face area whose degree of match with a face area of the user included in the first image is greater than or equal to a predetermined value from among the plurality of captured images;

generation means for generating a composite image including the specified second image; and output means for outputting the composite image.

(Supplementary Note B2)

The imaging providing system according to Supplementary note B1, wherein the image providing apparatus further comprises:

authentication control means for controlling face authentication for the face area of the user included in the first image, wherein the specification means specifies the second image when the face authentication is successful.

(Supplementary Note C1)

An image providing method performed by a computer, the image providing method comprising:

registering a plurality of captured images of a predetermined user taken at a plurality of locations, respectively, in a storage device;

acquiring a first image of the user captured at a specific location;

specifying one or more second images including a face area whose degree of match with a face area of the user included in the first image is greater than or equal to a predetermined value from among the plurality of captured images;
generating a composite image including the specified second image; and
outputting the composite image.

(Supplementary Note D1)

A non-transitory computer readable medium storing an image providing program for causing a computer to execute:
registration processing for registering a plurality of captured images of a predetermined user taken at a plurality of locations, respectively, in storage means;
acquisition processing for acquiring a first image of the user captured at a specific location;
specifying processing for specifying one or more second images including a face area whose degree of match with a face area of the user included in the first image is greater than or equal to a predetermined value from among the plurality of captured images;
generation processing for generating a composite image including the specified second image; and
output processing for outputting the composite image.

Although the present disclosure has been described above with reference to the above example embodiments (and examples), the present disclosure is not limited to the above example embodiments (and examples). Various modifications can be made to the configuration and details of the present disclosure within the scope of the present disclosure that would be understood by those skilled in the art.

REFERENCE SIGNS LIST

10 IMAGE PROVIDING APPARATUS
11 STORAGE UNIT
12 REGISTRATION UNIT
13 ACQUISITION UNIT
14 SPECIFICATION UNIT
15 GENERATION UNIT
16 OUTPUT UNIT
1000 IMAGE PROVIDING SYSTEM
100 AUTHENTICATION APPARATUS
110 FACE INFORMATION DB
111 USER ID
112 FACIAL FEATURE INFORMATION
120 FACE DETECTION UNIT
130 FEATURE POINT EXTRACTION UNIT
140 REGISTRATION UNIT
150 AUTHENTICATION UNIT
200 IMAGE PROVIDING APPARATUS
200a IMAGE PROVIDING APPARATUS
200b IMAGE PROVIDING APPARATUS
210 STORAGE UNIT
211 PROGRAM
211a PROGRAM
211b PROGRAM
212 HISTORY INFORMATION
2121 USER ID
2121a FACIAL FEATURE INFORMATION
2122 LOCATION ID
2123 DATE AND TIME
2124 CAPTURED IMAGE
2125 PAYMENT INFORMATION
213 LOCATION INFORMATION
2131 LOCATION ID
2132 ACCESS INFORMATION
214 FACE INFORMATION
2141 USER ID
2142 FACIAL FEATURE INFORMATION
220 MEMORY
230 COMMUNICATION UNIT
240 CONTROL UNIT
241 ACQUISITION UNIT
242 AUTHENTICATION CONTROL UNIT
242a AUTHENTICATION CONTROL UNIT
242b AUTHENTICATION CONTROL UNIT
243 REGISTRATION UNIT
243a REGISTRATION UNIT
243b REGISTRATION UNIT
244 SPECIFICATION UNIT
244a SPECIFICATION UNIT
245 GENERATION UNIT
246 OUTPUT UNIT
300 IMAGE STORAGE SERVER
310 COMPOSITE IMAGE
400 FACE AUTHENTICATION TERMINAL
401 FACE AUTHENTICATION TERMINAL
402 FACE AUTHENTICATION TERMINAL
40n FACE AUTHENTICATION TERMINAL
410 CAMERA
420 STORAGE UNIT
430 COMMUNICATION UNIT
440 DISPLAY UNIT
450 CONTROL UNIT
451 IMAGING CONTROL UNIT
452 REGISTRATION UNIT
453 AUTHENTICATION CONTROL UNIT
454 DISPLAY CONTROL UNIT
455 PAYMENT UNIT
500 USER TERMINAL
510 CAMERA
520 STORAGE UNIT
530 COMMUNICATION UNIT
540 DISPLAY UNIT
550 CONTROL UNIT
551 IMAGING CONTROL UNIT
552 REGISTRATION UNIT
553 ACQUISITION UNIT
554 DISPLAY CONTROL UNIT
A0 LOCATION
A1 LOCATION
A2 LOCATION
An LOCATION
610 DOWNLOAD GUIDANCE SCREEN
611 ACCESS INFORMATION
620 COMPOSITE IMAGE
621 CAPTURED IMAGE
622 CAPTURED IMAGE
623 CAPTURED IMAGE
624 CAPTURED IMAGE
62n CAPTURED IMAGE
N NETWORK
U USER

What is claimed is:

1. An image providing apparatus comprising:
at least one storage device storing instructions; and
at least one processor configured to execute the instructions to:
register a plurality of captured images of a user taken at a plurality of locations, respectively, in the at least one storage device, and an action history of the user at each location in the at least one storage device in association with the captured image corresponding to the location;
acquire a first image of the user captured at a specific location;

control face authentication for a face area of the user included in the first image; and when the face authentication is successful at the specific location and the action history satisfies a first condition, specify one or more second images including a face area for which a degree of match with the face area of the user included in the first image is greater than or equal to a predetermined value, from among the plurality of captured images;

generate a composite image including the specified one or more second images; and output the composite image.

2. The image providing apparatus according to claim 1, wherein the at least one storage device stores the facial feature information about the plurality of persons, and wherein the at least one processor is further configured to execute the instructions to:

control the face authentication by collating facial feature information extracted from the face area of the user included in the first image with facial feature information stored in the at least one storage device.

3. The image providing apparatus according to claim 1, wherein the at least one processor is further configured to execute the instructions to:

control the face authentication for the face area of the user included in each of the plurality of captured images, and register the captured image at the location where the face authentication is successful in the at least one storage device.

4. The image providing apparatus according to claim 3, wherein the at least one processor is further configured to execute the instructions to:

specify the second image when the face authentication is successful at the specified location and a number of the locations where the face authentication is successful, from among the plurality of locations, is greater than or equal to a predetermined number.

5. The image providing apparatus according to claim 1, wherein the at least one processor is further configured to execute the instructions to:

extract first facial feature information about the user from a first captured image taken at a first location from among the plurality of locations, and register the first captured image and the first facial feature information in the at least one storage device in association with each other, at a second location from among the plurality of locations, register second facial feature information about the user from a second captured image taken after the first captured image, and when a degree of match between the second facial feature information and the first facial feature information is greater than or equal to a predetermined value, register the second captured image in the at least one storage device in association with the first facial feature information, determine that the facial authentication is successful when a degree of match between third facial feature information extracted from the face area of the user included in the first image and the first facial feature information is greater than or equal to a predetermined value, and specify, when the facial authentication is successful, each of the first captured image and the second captured image associated with the first facial feature information as the second image from among the plurality of captured images.

6. The image providing apparatus according to claim 1, wherein the first condition is that a payment history of the user is greater than or equal to a predetermined amount.

7. The image providing apparatus according to claim 1, wherein the at least one processor is further configured to execute the instructions to:

specify attribute information of the user when the face authentication is successful, and specify the second image when the specified attribute information satisfies a second condition.

8. The image providing apparatus according to claim 7, wherein the at least one processor is further configured to execute the instructions to:

extract facial feature information from the face area of the user included in each of the plurality of captured images, and store the extracted facial feature information and the captured image from which the facial feature information is extracted in the at least one storage device in association with each other, and specify the captured image associated with the facial feature information whose for which a degree of match with the facial feature information extracted from the face area of the user included in the first image is greater than or equal to a predetermined value as the second image.

9. The image providing apparatus according to claim 1, wherein the at least one storage device further stores first access information for each of the plurality of locations, and wherein the at least one processor is further configured to execute the instructions to:

acquire the first access information for the location where the specified second image is captured from the at least one storage device, and incorporate the acquired first access information into the specified second image to generate the composite image.

10. The image providing apparatus according to claim 1, wherein the at least one processor is further configured to execute the instructions to:

output the composite image to a storage destination of the composite image, generate second access information indicating the storage destination, and present the second access information to the user.

11. The image providing apparatus according to claim 1, wherein the specific location is an airport boarding gate.

12. The image providing apparatus according to claim 1, wherein the specific location is an exit of a theme park.

13. An image providing system comprising:

a plurality of first imaging devices installed at a plurality of locations, respectively;

a second imaging device installed at a specific location; and an image providing apparatus connected to the plurality of first imaging devices and the second imaging device, wherein the image providing apparatus comprises:

at least one storage device configured to store instructions; and at least one processor configured to execute the instructions to:

register a plurality of captured images of a user taken at the plurality of locations, respectively, in the at least one storage device, and an action history of the user at each location in the at least one storage device in association with the captured image corresponding to the location;

acquire a first image of the user captured at the specific location;

control face authentication for a face area of the user included in the first image; and when the face authentication is successful at the specific location and the action history satisfies a first condition, specify one or more second images including a face area for which a degree of match with the face area of the user included in the first image is greater than or equal to a predetermined value, from among the plurality of captured images;

generate a composite image including the specified one or more second images; and output the composite image.

14. An image providing method performed by a computer and comprising:

registering a plurality of captured images of a user taken at a plurality of locations, respectively, in at least one storage device, and an action history of the user at each location in the at least one storage device in association with the captured image corresponding to the location;

acquiring a first image of the user captured at a specific location;

controlling face authentication for a face area of the user included in the first image; and when the face authentication is successful at the specific location and the action history satisfies a first condition, specifying one or more second images including a face area for which a degree of match with the face area of the user included in the first image is greater than or equal to a predetermined value, from among the plurality of captured images;

generating a composite image including the specified one or more second images; and outputting the composite image.

15. A non-transitory computer readable medium storing an image providing program for causing a computer to execute processing comprising:

registering a plurality of captured images of a user taken at a plurality of locations, respectively, in at least one storage device, and an action history of the user at each location in the at least one storage device in association with the captured image corresponding to the location;

acquiring a first image of the user captured at a specific location;

controlling face authentication for a face area of the user included in the first image; and when the face authentication is successful at the specific location and the action history satisfies a first condition, specifying one or more second images including a face area for which a degree of match with the face area of the user included in the first image is greater than or equal to a predetermined value, from among the plurality of captured images;

generating a composite image including the specified one or more second images; and outputting the composite image.

* * * * *